US011611625B2

(12) United States Patent
Jain et al.

(10) Patent No.: US 11,611,625 B2
(45) Date of Patent: Mar. 21, 2023

(54) PROVIDING STATEFUL SERVICES IN A SCALABLE MANNER FOR MACHINES EXECUTING ON HOST COMPUTERS

(71) Applicant: VMware, Inc., Palo Alto, CA (US)

(72) Inventors: Jayant Jain, Cupertino, CA (US); Anirban Sengupta, Saratoga, CA (US); Rick Lund, Livermore, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/122,153

(22) Filed: Dec. 15, 2020

(65) Prior Publication Data

US 2022/0191304 A1 Jun. 16, 2022

(51) Int. Cl.
| | | |
|---|---|---|
| *H04L 29/08* | (2006.01) | |
| *H04L 15/16* | (2006.01) | |
| *G06F 9/455* | (2018.01) | |
| *H04L 29/06* | (2006.01) | |
| *G06F 9/50* | (2006.01) | |

(Continued)

(52) U.S. Cl.
CPC .......... *H04L 67/34* (2013.01); *G06F 9/45558* (2013.01); *H04L 67/51* (2022.05); *G06F 2009/45562* (2013.01); *G06F 2009/45595* (2013.01)

(58) Field of Classification Search
CPC ..... H04L 67/34; H04L 67/16; G06F 9/45558; G06F 2009/45562; G06F 2009/45595
USPC ....................................................... 709/224
See application file for complete search history.

(56) References Cited

U.S. PATENT DOCUMENTS

| 6,006,264 A | 12/1999 | Colby et al. |
| 6,104,700 A | 8/2000 | Haddock et al. |
| 6,154,448 A | 11/2000 | Petersen et al. |

(Continued)

FOREIGN PATENT DOCUMENTS

| CA | 3034809 A1 * | 3/2018 | ......... G06F 9/45558 |
| CN | 1689369 A | 10/2005 | |

(Continued)

OTHER PUBLICATIONS

Author Unknown, "Datagram," Jun. 22, 2012, 2 pages, retrieved from https://web.archive.org/web/20120622031055/https://en.wikipedia.org/wiki/datagram.

(Continued)

*Primary Examiner* — David R Lazaro
*Assistant Examiner* — Berhanu Shitayewoldetadik
(74) *Attorney, Agent, or Firm* — Adeli LLP

(57) ABSTRACT

Some embodiments provide a method for performing services on a host computer that executes several machines in a datacenter. The method configures a first set of one or more service containers for a first machine executing on the host computer, and a second set of one or more service containers for a second machine executing on the host computer. Each configured service container performs a service operation on data messages associated with a particular machine. For each particular machine, the method also configures a module along the particular machine's datapath to identify a subset of service operations to perform on a set of data messages associated with the particular machine, and to direct the set of data messages to a set of service containers configured for the particular machine to perform the identified set of service operations on the set of data messages.

21 Claims, 10 Drawing Sheets

(51) Int. Cl.
*H04L 67/00* (2022.01)
*H04L 67/51* (2022.01)

(56) References Cited

U.S. PATENT DOCUMENTS

| | | | |
|---|---|---|---|
| 6,772,211 B2 | 8/2004 | Lu et al. |
| 6,779,030 B1 | 8/2004 | Dugan et al. |
| 6,826,694 B1 | 11/2004 | Dutta et al. |
| 6,880,089 B1 | 4/2005 | Bommareddy et al. |
| 6,985,956 B2 | 1/2006 | Luke et al. |
| 7,013,389 B1 | 3/2006 | Srivastava et al. |
| 7,209,977 B2 | 4/2007 | Acharya et al. |
| 7,239,639 B2 | 7/2007 | Cox et al. |
| 7,379,465 B2 | 5/2008 | Aysan et al. |
| 7,406,540 B2 | 7/2008 | Acharya et al. |
| 7,447,775 B1 | 11/2008 | Zhu et al. |
| 7,480,737 B2 | 1/2009 | Chauffour et al. |
| 7,487,250 B2 | 2/2009 | Siegel |
| 7,499,463 B1 | 3/2009 | Droux et al. |
| 7,649,890 B2 | 1/2010 | Mizutani et al. |
| 7,698,458 B1 | 4/2010 | Liu et al. |
| 7,818,452 B2 | 10/2010 | Matthews et al. |
| 7,898,959 B1 | 3/2011 | Arad |
| 7,948,986 B1 | 5/2011 | Ghosh et al. |
| 8,078,903 B1 | 12/2011 | Parthasarathy et al. |
| 8,094,575 B1 | 1/2012 | Vadlakonda et al. |
| 8,175,863 B1 | 5/2012 | Ostermeyer et al. |
| 8,190,767 B1 | 5/2012 | Maufer et al. |
| 8,201,219 B2 | 6/2012 | Jones |
| 8,223,634 B2 | 7/2012 | Tanaka et al. |
| 8,224,885 B1 | 7/2012 | Doucette et al. |
| 8,230,493 B2 | 7/2012 | Davidson et al. |
| 8,266,261 B2 | 9/2012 | Akagi |
| 8,339,959 B1 | 12/2012 | Moisand et al. |
| 8,451,735 B2 | 5/2013 | Li |
| 8,484,348 B2 | 7/2013 | Subramanian et al. |
| 8,488,577 B1 | 7/2013 | Macpherson |
| 8,521,879 B1 | 8/2013 | Pena et al. |
| 8,615,009 B1 | 12/2013 | Ramamoorthi et al. |
| 8,707,383 B2 | 4/2014 | Bade et al. |
| 8,743,885 B2 | 6/2014 | Khan et al. |
| 8,804,720 B1 | 8/2014 | Rainovic et al. |
| 8,804,746 B2 | 8/2014 | Wu et al. |
| 8,811,412 B2 | 8/2014 | Shippy |
| 8,830,834 B2 | 9/2014 | Sharma et al. |
| 8,832,683 B2 | 9/2014 | Heim |
| 8,849,746 B2 | 9/2014 | Candea et al. |
| 8,856,518 B2 | 10/2014 | Sridharan et al. |
| 8,862,883 B2 | 10/2014 | Cherukur et al. |
| 8,868,711 B2 | 10/2014 | Skjolsvold et al. |
| 8,873,399 B2 | 10/2014 | Bothos et al. |
| 8,874,789 B1 | 10/2014 | Zhu |
| 8,892,706 B1 | 11/2014 | Dalal |
| 8,913,611 B2 | 12/2014 | Koponen et al. |
| 8,914,406 B1 | 12/2014 | Haugsnes et al. |
| 8,966,024 B2 | 2/2015 | Koponen et al. |
| 8,966,029 B2 | 2/2015 | Zhang et al. |
| 8,971,345 B1 | 3/2015 | McCanne et al. |
| 8,989,192 B2 | 3/2015 | Foo et al. |
| 8,996,610 B1 | 3/2015 | Sureshchandra et al. |
| 9,009,289 B1 | 4/2015 | Jacob |
| 9,015,823 B2 | 4/2015 | Koponen et al. |
| 9,094,464 B1 | 7/2015 | Scharber et al. |
| 9,104,497 B2 | 8/2015 | Mortazavi |
| 9,148,367 B2 | 9/2015 | Kandaswamy et al. |
| 9,172,603 B2 | 10/2015 | Padmanabhan et al. |
| 9,178,709 B2 | 11/2015 | Higashida et al. |
| 9,191,293 B2 | 11/2015 | Iovene et al. |
| 9,195,491 B2 | 11/2015 | Zhang et al. |
| 9,203,748 B2 | 12/2015 | Jiang et al. |
| 9,225,638 B2 | 12/2015 | Jain et al. |
| 9,225,659 B2 | 12/2015 | McCanne et al. |
| 9,232,342 B2 | 1/2016 | Seed et al. |
| 9,256,467 B1 * | 2/2016 | Singh .................. G06F 9/5055 |
| 9,258,742 B1 | 2/2016 | Pianigiani et al. |
| 9,264,313 B1 | 2/2016 | Manuguri et al. |
| 9,277,412 B2 | 3/2016 | Freda et al. |
| 9,344,337 B2 | 5/2016 | Kumar et al. |
| 9,363,183 B2 | 6/2016 | Kumar et al. |
| 9,397,946 B1 | 7/2016 | Yadav |
| 9,407,540 B2 | 8/2016 | Kumar et al. |
| 9,407,599 B2 | 8/2016 | Koponen et al. |
| 9,419,897 B2 | 8/2016 | Cherian et al. |
| 9,442,752 B1 * | 9/2016 | Roth .................. G06F 9/45558 |
| 9,467,382 B2 | 10/2016 | Kumar et al. |
| 9,479,358 B2 | 10/2016 | Klosowski et al. |
| 9,503,530 B1 | 11/2016 | Niedzielski |
| 9,531,590 B2 | 12/2016 | Jain et al. |
| 9,577,845 B2 | 2/2017 | Thakkar et al. |
| 9,602,380 B2 | 3/2017 | Strassner |
| 9,608,896 B2 | 3/2017 | Kumar et al. |
| 9,660,905 B2 | 5/2017 | Dunbar et al. |
| 9,686,192 B2 | 6/2017 | Sengupta et al. |
| 9,686,200 B2 | 6/2017 | Pettit et al. |
| 9,705,702 B2 | 7/2017 | Foo et al. |
| 9,705,775 B2 | 7/2017 | Zhang et al. |
| 9,749,229 B2 | 8/2017 | Previdi et al. |
| 9,755,898 B2 | 9/2017 | Jain et al. |
| 9,755,971 B2 | 9/2017 | Wang et al. |
| 9,774,537 B2 | 9/2017 | Jain et al. |
| 9,787,559 B1 | 10/2017 | Schroeder |
| 9,787,605 B2 | 10/2017 | Zhang et al. |
| 9,804,797 B1 | 10/2017 | Ng et al. |
| 9,825,810 B2 | 11/2017 | Jain et al. |
| 9,860,079 B2 | 1/2018 | Cohn et al. |
| 9,900,410 B2 | 2/2018 | Dalal |
| 9,935,827 B2 | 4/2018 | Jain et al. |
| 9,979,641 B2 | 5/2018 | Jain et al. |
| 9,985,896 B2 | 5/2018 | Koponen et al. |
| 9,996,380 B2 * | 6/2018 | Singh .................. G06F 9/5077 |
| 10,013,276 B2 | 7/2018 | Fahs et al. |
| 10,042,722 B1 | 8/2018 | Chigurupati et al. |
| 10,075,470 B2 | 9/2018 | Vaidya et al. |
| 10,079,779 B2 | 9/2018 | Zhang et al. |
| 10,084,703 B2 | 9/2018 | Kumar et al. |
| 10,089,127 B2 | 10/2018 | Padmanabhan et al. |
| 10,091,276 B2 | 10/2018 | Bloomquist et al. |
| 10,104,169 B1 | 10/2018 | Moniz et al. |
| 10,129,077 B2 | 11/2018 | Jain et al. |
| 10,129,180 B2 | 11/2018 | Zhang et al. |
| 10,135,636 B2 | 11/2018 | Jiang et al. |
| 10,135,737 B2 | 11/2018 | Jain et al. |
| 10,158,573 B1 | 12/2018 | Lee et al. |
| 10,187,306 B2 | 1/2019 | Nainar et al. |
| 10,200,493 B2 | 2/2019 | Bendapudi et al. |
| 10,212,071 B2 | 2/2019 | Kancherla et al. |
| 10,225,137 B2 | 3/2019 | Jain et al. |
| 10,237,379 B2 | 3/2019 | Kumar et al. |
| 10,250,501 B2 | 4/2019 | Ni |
| 10,257,095 B2 | 4/2019 | Jain et al. |
| 10,284,390 B2 | 5/2019 | Kumar et al. |
| 10,305,822 B2 | 5/2019 | Tao et al. |
| 10,320,679 B2 | 6/2019 | Jain et al. |
| 10,333,822 B1 | 6/2019 | Jeuk et al. |
| 10,341,233 B2 | 7/2019 | Jain et al. |
| 10,341,427 B2 | 7/2019 | Jalan et al. |
| 10,375,155 B1 | 8/2019 | Cai et al. |
| 10,390,285 B2 | 8/2019 | Zhou |
| 10,397,275 B2 | 8/2019 | Jain et al. |
| 10,445,509 B2 | 10/2019 | Thota et al. |
| 10,484,334 B1 | 11/2019 | Lee et al. |
| 10,514,941 B2 | 12/2019 | Zhang et al. |
| 10,516,568 B2 | 12/2019 | Jain et al. |
| 10,547,508 B1 | 1/2020 | Kanakarajan |
| 10,547,692 B2 | 1/2020 | Salgueiro et al. |
| 10,554,484 B2 | 2/2020 | Chanda et al. |
| 10,594,743 B2 | 3/2020 | Hong et al. |
| 10,609,091 B2 | 3/2020 | Hong et al. |
| 10,609,122 B1 * | 3/2020 | Argenti .................. G06F 9/455 |
| 10,623,309 B1 * | 4/2020 | Gampel ............ H04L 41/0894 |
| 10,637,750 B1 | 4/2020 | Bollineni et al. |
| 10,645,060 B2 | 5/2020 | Ao et al. |
| 10,645,201 B2 | 5/2020 | Mishra et al. |
| 10,659,252 B2 | 5/2020 | Boutros et al. |

(56) References Cited

U.S. PATENT DOCUMENTS

| | | |
|---|---|---|
| 10,693,782 B2 | 6/2020 | Jain et al. |
| 10,700,891 B2 | 6/2020 | Hao et al. |
| 10,708,229 B2 | 7/2020 | Sevinc et al. |
| 10,728,174 B2 | 7/2020 | Boutros et al. |
| 10,735,311 B2 | 8/2020 | Li |
| 10,742,544 B2 | 8/2020 | Roeland et al. |
| 10,757,077 B2 | 8/2020 | Rajahalme et al. |
| 10,797,910 B2 | 10/2020 | Boutros et al. |
| 10,797,966 B2 | 10/2020 | Boutros et al. |
| 10,802,858 B2 * | 10/2020 | Gunda .................... G06F 21/50 |
| 10,805,181 B2 | 10/2020 | Boutros et al. |
| 10,805,192 B2 | 10/2020 | Boutros et al. |
| 10,812,378 B2 | 10/2020 | Nainar et al. |
| 10,826,835 B2 | 11/2020 | Ruckstuhl et al. |
| 10,834,004 B2 | 11/2020 | Yigit et al. |
| 10,853,111 B1 | 12/2020 | Gupta et al. |
| 10,929,171 B2 | 2/2021 | Gokhale et al. |
| 10,931,793 B2 | 2/2021 | Kumar et al. |
| 10,938,668 B1 * | 3/2021 | Zulak .................... G06F 9/4881 |
| 10,938,716 B1 | 3/2021 | Chin et al. |
| 10,944,673 B2 | 3/2021 | Naveen et al. |
| 10,949,244 B2 | 3/2021 | Naveen et al. |
| 10,997,177 B1 | 5/2021 | Howes et al. |
| 11,003,482 B2 | 5/2021 | Rolando et al. |
| 11,012,420 B2 | 5/2021 | Sevinc et al. |
| 11,036,538 B2 | 6/2021 | Lecuyer et al. |
| 11,038,782 B2 | 6/2021 | Boutros et al. |
| 11,042,397 B2 | 6/2021 | Mishra et al. |
| 11,055,273 B1 * | 7/2021 | Meduri ............... G06F 16/2358 |
| 11,074,097 B2 | 7/2021 | Naveen et al. |
| 11,075,839 B2 | 7/2021 | Zhuang et al. |
| 11,075,842 B2 | 7/2021 | Jain et al. |
| 11,086,654 B2 | 8/2021 | Rolando et al. |
| 11,119,804 B2 | 9/2021 | Gokhale et al. |
| 11,140,218 B2 | 10/2021 | Tidemann et al. |
| 11,153,190 B1 | 10/2021 | Mahajan et al. |
| 11,153,406 B2 | 10/2021 | Sawant et al. |
| 11,157,304 B2 * | 10/2021 | Watt, Jr. ................ G06F 9/5077 |
| 11,184,397 B2 * | 11/2021 | Annadata ................ H04L 63/20 |
| 11,194,610 B2 | 12/2021 | Mundaragi et al. |
| 11,212,356 B2 | 12/2021 | Rolando et al. |
| 11,223,494 B2 | 1/2022 | Mishra et al. |
| 11,249,784 B2 | 2/2022 | Chalvadi et al. |
| 11,265,187 B2 | 3/2022 | Boutros et al. |
| 11,277,331 B2 | 3/2022 | Rolando et al. |
| 11,283,717 B2 | 3/2022 | Tidemann et al. |
| 11,288,088 B2 | 3/2022 | Rolando et al. |
| 11,294,703 B2 | 4/2022 | Rolando et al. |
| 11,296,930 B2 | 4/2022 | Jain et al. |
| 11,301,281 B2 | 4/2022 | Rolando et al. |
| 11,316,900 B1 | 4/2022 | Schottland et al. |
| 11,321,113 B2 | 5/2022 | Feng et al. |
| 11,398,983 B2 | 7/2022 | Wijnands et al. |
| 2002/0010783 A1 | 1/2002 | Primak et al. |
| 2002/0078370 A1 | 6/2002 | Tahan |
| 2002/0097724 A1 | 7/2002 | Halme et al. |
| 2002/0194350 A1 | 12/2002 | Lu et al. |
| 2003/0065711 A1 | 4/2003 | Acharya et al. |
| 2003/0093481 A1 | 5/2003 | Mitchell et al. |
| 2003/0097429 A1 | 5/2003 | Wu et al. |
| 2003/0105812 A1 | 6/2003 | Flowers et al. |
| 2003/0188026 A1 | 10/2003 | Denton et al. |
| 2003/0236813 A1 | 12/2003 | Abjanic |
| 2004/0066769 A1 | 4/2004 | Ahmavaara et al. |
| 2004/0210670 A1 | 10/2004 | Anerousis et al. |
| 2004/0215703 A1 | 10/2004 | Song et al. |
| 2005/0021713 A1 | 1/2005 | Dugan et al. |
| 2005/0089327 A1 | 4/2005 | Ovadia et al. |
| 2005/0091396 A1 | 4/2005 | Nilakantan et al. |
| 2005/0114429 A1 | 5/2005 | Caccavale |
| 2005/0114648 A1 | 5/2005 | Akundi et al. |
| 2005/0132030 A1 | 6/2005 | Hopen et al. |
| 2005/0198200 A1 | 9/2005 | Subramanian et al. |
| 2005/0249199 A1 | 11/2005 | Albert et al. |
| 2006/0069776 A1 | 3/2006 | Shim et al. |
| 2006/0112297 A1 | 5/2006 | Davidson |
| 2006/0130133 A1 | 6/2006 | Andreev et al. |
| 2006/0155862 A1 | 7/2006 | Kathi et al. |
| 2006/0195896 A1 | 8/2006 | Fulp et al. |
| 2006/0233155 A1 | 10/2006 | Srivastava |
| 2007/0061492 A1 | 3/2007 | Riel |
| 2007/0121615 A1 | 5/2007 | Weill et al. |
| 2007/0153782 A1 | 7/2007 | Fletcher et al. |
| 2007/0214282 A1 | 9/2007 | Sen |
| 2007/0248091 A1 | 10/2007 | Khalid et al. |
| 2007/0260750 A1 | 11/2007 | Feied et al. |
| 2007/0288615 A1 | 12/2007 | Keohane et al. |
| 2007/0291773 A1 | 12/2007 | Khan et al. |
| 2008/0005293 A1 | 1/2008 | Bhargava et al. |
| 2008/0031263 A1 | 2/2008 | Ervin et al. |
| 2008/0046400 A1 | 2/2008 | Shi et al. |
| 2008/0049614 A1 | 2/2008 | Briscoe et al. |
| 2008/0049619 A1 | 2/2008 | Twiss |
| 2008/0049786 A1 | 2/2008 | Ram et al. |
| 2008/0072305 A1 | 3/2008 | Casado et al. |
| 2008/0084819 A1 | 4/2008 | Parizhsky et al. |
| 2008/0095153 A1 | 4/2008 | Fukunaga et al. |
| 2008/0104608 A1 | 5/2008 | Hyser et al. |
| 2008/0195755 A1 | 8/2008 | Lu et al. |
| 2008/0225714 A1 | 9/2008 | Denis |
| 2008/0239991 A1 | 10/2008 | Applegate et al. |
| 2008/0247396 A1 | 10/2008 | Hazard |
| 2008/0276085 A1 | 11/2008 | Davidson et al. |
| 2008/0279196 A1 | 11/2008 | Friskney et al. |
| 2009/0003349 A1 | 1/2009 | Havemann et al. |
| 2009/0003364 A1 | 1/2009 | Fendick et al. |
| 2009/0003375 A1 | 1/2009 | Havemann et al. |
| 2009/0019135 A1 | 1/2009 | Eswaran et al. |
| 2009/0037713 A1 | 2/2009 | Khalid et al. |
| 2009/0063706 A1 | 3/2009 | Goldman et al. |
| 2009/0129271 A1 | 5/2009 | Ramankutty et al. |
| 2009/0172666 A1 | 7/2009 | Yahalom et al. |
| 2009/0199268 A1 | 8/2009 | Ahmavaara et al. |
| 2009/0235325 A1 | 9/2009 | Dimitrakos et al. |
| 2009/0238084 A1 | 9/2009 | Nadeau et al. |
| 2009/0249472 A1 | 10/2009 | Litvin et al. |
| 2009/0265467 A1 | 10/2009 | Peles et al. |
| 2009/0271586 A1 | 10/2009 | Shaath |
| 2009/0299791 A1 | 12/2009 | Blake et al. |
| 2009/0300210 A1 | 12/2009 | Ferris |
| 2009/0303880 A1 | 12/2009 | Maltz et al. |
| 2009/0307334 A1 | 12/2009 | Maltz et al. |
| 2009/0327464 A1 | 12/2009 | Archer et al. |
| 2010/0031360 A1 | 2/2010 | Seshadri et al. |
| 2010/0036903 A1 | 2/2010 | Ahmad et al. |
| 2010/0100616 A1 | 4/2010 | Bryson et al. |
| 2010/0131638 A1 | 5/2010 | Kondamuru |
| 2010/0165985 A1 | 7/2010 | Sharma et al. |
| 2010/0223364 A1 | 9/2010 | Wei |
| 2010/0223621 A1 | 9/2010 | Joshi et al. |
| 2010/0235915 A1 | 9/2010 | Memon et al. |
| 2010/0254385 A1 | 10/2010 | Sharma et al. |
| 2010/0257278 A1 | 10/2010 | Gunturu |
| 2010/0265824 A1 | 10/2010 | Chao et al. |
| 2010/0281482 A1 | 11/2010 | Pike et al. |
| 2010/0332595 A1 | 12/2010 | Fullagar et al. |
| 2011/0010578 A1 | 1/2011 | Dominguez et al. |
| 2011/0016348 A1 | 1/2011 | Pace et al. |
| 2011/0022695 A1 | 1/2011 | Dalal et al. |
| 2011/0022812 A1 | 1/2011 | Van Der Linden et al. |
| 2011/0035494 A1 | 2/2011 | Pandey et al. |
| 2011/0040893 A1 | 2/2011 | Karaoguz et al. |
| 2011/0055845 A1 | 3/2011 | Nandagopal et al. |
| 2011/0058563 A1 | 3/2011 | Saraph et al. |
| 2011/0090912 A1 | 4/2011 | Shippy |
| 2011/0164504 A1 | 7/2011 | Bothos et al. |
| 2011/0194563 A1 | 8/2011 | Shen et al. |
| 2011/0211463 A1 | 9/2011 | Matityahu et al. |
| 2011/0225293 A1 | 9/2011 | Rathod |
| 2011/0235508 A1 | 9/2011 | Goel et al. |
| 2011/0261811 A1 | 10/2011 | Battestilli et al. |
| 2011/0268118 A1 | 11/2011 | Schlansker et al. |
| 2011/0271007 A1 | 11/2011 | Wang et al. |
| 2011/0276695 A1 | 11/2011 | Maldaner |

(56) References Cited

U.S. PATENT DOCUMENTS

| | | |
|---|---|---|
| 2011/0283013 A1 | 11/2011 | Grosser et al. |
| 2011/0295991 A1 | 12/2011 | Aida |
| 2011/0317708 A1 | 12/2011 | Clark |
| 2012/0005265 A1 | 1/2012 | Ushioda et al. |
| 2012/0011281 A1 | 1/2012 | Hamada et al. |
| 2012/0014386 A1 | 1/2012 | Xiong et al. |
| 2012/0023231 A1 | 1/2012 | Ueno |
| 2012/0054266 A1 | 3/2012 | Kazerani et al. |
| 2012/0089664 A1 | 4/2012 | Igelka |
| 2012/0137004 A1 | 5/2012 | Smith |
| 2012/0140719 A1 | 6/2012 | Hui et al. |
| 2012/0144014 A1 | 6/2012 | Natham et al. |
| 2012/0147894 A1 | 6/2012 | Mulligan et al. |
| 2012/0155266 A1 | 6/2012 | Patel et al. |
| 2012/0176932 A1 | 7/2012 | Wu et al. |
| 2012/0185588 A1 | 7/2012 | Error |
| 2012/0195196 A1 | 8/2012 | Ghai et al. |
| 2012/0207174 A1 | 8/2012 | Shieh |
| 2012/0213074 A1 | 8/2012 | Goldfarb et al. |
| 2012/0230187 A1 | 9/2012 | Tremblay et al. |
| 2012/0239804 A1 | 9/2012 | Liu et al. |
| 2012/0246637 A1 | 9/2012 | Kreeger et al. |
| 2012/0266252 A1 | 10/2012 | Spiers et al. |
| 2012/0281540 A1 | 11/2012 | Khan et al. |
| 2012/0287789 A1 | 11/2012 | Aybay et al. |
| 2012/0303784 A1 | 11/2012 | Zisapel et al. |
| 2012/0303809 A1 | 11/2012 | Patel et al. |
| 2012/0311568 A1 | 12/2012 | Jansen |
| 2012/0317260 A1 | 12/2012 | Husain et al. |
| 2012/0317570 A1 | 12/2012 | Dalcher et al. |
| 2012/0331188 A1 | 12/2012 | Riordan et al. |
| 2013/0003735 A1 | 1/2013 | Chao et al. |
| 2013/0021942 A1 | 1/2013 | Bacthu et al. |
| 2013/0031544 A1 | 1/2013 | Sridharan et al. |
| 2013/0039218 A1 | 2/2013 | Narasimhan et al. |
| 2013/0044636 A1 | 2/2013 | Koponen et al. |
| 2013/0058346 A1 | 3/2013 | Sridharan et al. |
| 2013/0073743 A1 | 3/2013 | Ramasamy et al. |
| 2013/0100851 A1 | 4/2013 | Bacthu et al. |
| 2013/0125120 A1 | 5/2013 | Zhang et al. |
| 2013/0136126 A1 | 5/2013 | Wang et al. |
| 2013/0142048 A1 | 6/2013 | Gross, IV et al. |
| 2013/0148505 A1 | 6/2013 | Koponen et al. |
| 2013/0151661 A1 | 6/2013 | Koponen et al. |
| 2013/0159487 A1 | 6/2013 | Patel et al. |
| 2013/0160024 A1 | 6/2013 | Shtilman et al. |
| 2013/0163594 A1 | 6/2013 | Sharma et al. |
| 2013/0166703 A1 | 6/2013 | Hammer et al. |
| 2013/0170501 A1 | 7/2013 | Egi et al. |
| 2013/0201989 A1 | 8/2013 | Hu et al. |
| 2013/0227097 A1 | 8/2013 | Yasuda et al. |
| 2013/0227550 A1 | 8/2013 | Weinstein et al. |
| 2013/0287026 A1 | 10/2013 | Davie |
| 2013/0287036 A1 | 10/2013 | Banavalikar et al. |
| 2013/0291088 A1 | 10/2013 | Shieh et al. |
| 2013/0297798 A1 | 11/2013 | Arisoylu et al. |
| 2013/0301472 A1 | 11/2013 | Mian |
| 2013/0311637 A1 | 11/2013 | Kamath et al. |
| 2013/0318219 A1 | 11/2013 | Kancherla |
| 2013/0332983 A1 | 12/2013 | Koorevaar et al. |
| 2013/0336319 A1 | 12/2013 | Liu et al. |
| 2013/0343174 A1 | 12/2013 | Guichard et al. |
| 2013/0343378 A1 | 12/2013 | Veteikis et al. |
| 2014/0003232 A1 | 1/2014 | Guichard et al. |
| 2014/0003422 A1 | 1/2014 | Mogul et al. |
| 2014/0010085 A1 | 1/2014 | Kavunder et al. |
| 2014/0029447 A1 | 1/2014 | Schrum, Jr. |
| 2014/0046997 A1 | 2/2014 | Dain et al. |
| 2014/0046998 A1 | 2/2014 | Dain et al. |
| 2014/0050223 A1 | 2/2014 | Foo et al. |
| 2014/0052844 A1 | 2/2014 | Nayak et al. |
| 2014/0059204 A1 | 2/2014 | Nguyen et al. |
| 2014/0059544 A1 | 2/2014 | Koganty et al. |
| 2014/0068602 A1 | 3/2014 | Gember et al. |
| 2014/0092738 A1 | 4/2014 | Grandhi et al. |
| 2014/0092906 A1 | 4/2014 | Kandaswamy et al. |
| 2014/0092914 A1 | 4/2014 | Kondapalli |
| 2014/0096183 A1 | 4/2014 | Jain et al. |
| 2014/0101226 A1 | 4/2014 | Khandekar et al. |
| 2014/0101656 A1 | 4/2014 | Zhu et al. |
| 2014/0108665 A1 | 4/2014 | Arora et al. |
| 2014/0115578 A1 | 4/2014 | Cooper et al. |
| 2014/0129715 A1 | 5/2014 | Mortazavi |
| 2014/0149696 A1 | 5/2014 | Frenkel et al. |
| 2014/0164477 A1 | 6/2014 | Springer et al. |
| 2014/0169168 A1 | 6/2014 | Jalan et al. |
| 2014/0169375 A1 | 6/2014 | Khan et al. |
| 2014/0195666 A1 | 7/2014 | Dumitriu et al. |
| 2014/0207968 A1 | 7/2014 | Kumar et al. |
| 2014/0254374 A1 | 9/2014 | Janakiraman et al. |
| 2014/0254591 A1 | 9/2014 | Mahadevan et al. |
| 2014/0269487 A1 | 9/2014 | Kalkunte |
| 2014/0269717 A1 | 9/2014 | Thubert et al. |
| 2014/0269724 A1 | 9/2014 | Mehler et al. |
| 2014/0280896 A1 | 9/2014 | Papakostas et al. |
| 2014/0281029 A1 | 9/2014 | Danforth |
| 2014/0282526 A1 | 9/2014 | Basavaiah et al. |
| 2014/0301388 A1 | 10/2014 | Jagadish et al. |
| 2014/0304231 A1 | 10/2014 | Kamath et al. |
| 2014/0307744 A1 | 10/2014 | Dunbar et al. |
| 2014/0310391 A1 | 10/2014 | Sorenson et al. |
| 2014/0310418 A1 | 10/2014 | Sorenson et al. |
| 2014/0317677 A1 | 10/2014 | Vaidya et al. |
| 2014/0321459 A1 | 10/2014 | Kumar et al. |
| 2014/0330983 A1 | 11/2014 | Zisapel et al. |
| 2014/0334485 A1 | 11/2014 | Jain et al. |
| 2014/0334488 A1 | 11/2014 | Guichard et al. |
| 2014/0341029 A1 | 11/2014 | Allan et al. |
| 2014/0351452 A1 | 11/2014 | Bosch et al. |
| 2014/0362682 A1 | 12/2014 | Guichard et al. |
| 2014/0362705 A1 | 12/2014 | Pan |
| 2014/0369204 A1 | 12/2014 | Anand et al. |
| 2014/0372567 A1 | 12/2014 | Ganesh et al. |
| 2014/0372616 A1 | 12/2014 | Arisoylu et al. |
| 2014/0372702 A1 | 12/2014 | Subramanyam et al. |
| 2015/0003453 A1 | 1/2015 | Sengupta et al. |
| 2015/0003455 A1 | 1/2015 | Haddad et al. |
| 2015/0009995 A1 | 1/2015 | Gross, IV et al. |
| 2015/0016279 A1 | 1/2015 | Zhang et al. |
| 2015/0023354 A1 | 1/2015 | Li et al. |
| 2015/0026345 A1 | 1/2015 | Ravinoothala et al. |
| 2015/0026362 A1 | 1/2015 | Guichard et al. |
| 2015/0030024 A1 | 1/2015 | Venkataswami et al. |
| 2015/0052262 A1 | 2/2015 | Chanda et al. |
| 2015/0052522 A1 | 2/2015 | Chanda et al. |
| 2015/0063102 A1 | 3/2015 | Mestery et al. |
| 2015/0063364 A1 | 3/2015 | Thakkar et al. |
| 2015/0071285 A1 | 3/2015 | Kumar et al. |
| 2015/0071301 A1 | 3/2015 | Dalal |
| 2015/0073967 A1 | 3/2015 | Katsuyama et al. |
| 2015/0078384 A1 | 3/2015 | Jackson et al. |
| 2015/0092551 A1 | 4/2015 | Moisand et al. |
| 2015/0092564 A1 | 4/2015 | Aldrin |
| 2015/0103645 A1 | 4/2015 | Shen et al. |
| 2015/0103679 A1 | 4/2015 | Tessmer et al. |
| 2015/0103827 A1 | 4/2015 | Quinn et al. |
| 2015/0109901 A1 | 4/2015 | Tan et al. |
| 2015/0124608 A1 | 5/2015 | Agarwal et al. |
| 2015/0124622 A1 | 5/2015 | Kovvali et al. |
| 2015/0124840 A1 | 5/2015 | Bergeron |
| 2015/0138973 A1 | 5/2015 | Kumar et al. |
| 2015/0139041 A1 | 5/2015 | Bosch et al. |
| 2015/0146539 A1 | 5/2015 | Mehta et al. |
| 2015/0156035 A1 | 6/2015 | Foo et al. |
| 2015/0188770 A1 | 7/2015 | Naiksatam et al. |
| 2015/0195197 A1 | 7/2015 | Yong et al. |
| 2015/0213087 A1 | 7/2015 | Sikri |
| 2015/0215819 A1 | 7/2015 | Bosch et al. |
| 2015/0222640 A1 | 8/2015 | Kumar et al. |
| 2015/0236948 A1 | 8/2015 | Dunbar et al. |
| 2015/0237013 A1 | 8/2015 | Bansal et al. |
| 2015/0242197 A1 | 8/2015 | Alfonso et al. |
| 2015/0244617 A1 | 8/2015 | Nakil et al. |
| 2015/0263901 A1 | 9/2015 | Kumar et al. |

(56) References Cited

U.S. PATENT DOCUMENTS

| | | |
|---|---|---|
| 2015/0263946 A1 | 9/2015 | Tubaltsev et al. |
| 2015/0271102 A1 | 9/2015 | Antich |
| 2015/0280959 A1 | 10/2015 | Vincent |
| 2015/0281089 A1 | 10/2015 | Marchetti |
| 2015/0281098 A1 | 10/2015 | Pettit et al. |
| 2015/0281125 A1 | 10/2015 | Koponen et al. |
| 2015/0281179 A1* | 10/2015 | Raman ................ H04L 63/0272 726/11 |
| 2015/0281180 A1 | 10/2015 | Raman et al. |
| 2015/0288671 A1 | 10/2015 | Chan et al. |
| 2015/0288679 A1 | 10/2015 | Ben-Nun et al. |
| 2015/0295831 A1 | 10/2015 | Kumar et al. |
| 2015/0319078 A1 | 11/2015 | Lee et al. |
| 2015/0319096 A1 | 11/2015 | Yip et al. |
| 2015/0358235 A1 | 12/2015 | Zhang et al. |
| 2015/0358294 A1 | 12/2015 | Kancharla et al. |
| 2015/0365322 A1 | 12/2015 | Shatzkamer et al. |
| 2015/0370586 A1 | 12/2015 | Cooper et al. |
| 2015/0370596 A1 | 12/2015 | Fahs et al. |
| 2015/0372840 A1 | 12/2015 | Benny et al. |
| 2015/0372911 A1 | 12/2015 | Yabusaki et al. |
| 2015/0379277 A1 | 12/2015 | Thota et al. |
| 2015/0381493 A1 | 12/2015 | Bansal et al. |
| 2015/0381494 A1 | 12/2015 | Cherian et al. |
| 2015/0381495 A1 | 12/2015 | Cherian et al. |
| 2016/0006654 A1 | 1/2016 | Fernando et al. |
| 2016/0028640 A1 | 1/2016 | Zhang et al. |
| 2016/0043901 A1 | 2/2016 | Sankar et al. |
| 2016/0043952 A1 | 2/2016 | Zhang et al. |
| 2016/0057050 A1 | 2/2016 | Ostrom et al. |
| 2016/0057687 A1 | 2/2016 | Horn et al. |
| 2016/0065503 A1 | 3/2016 | Yohe et al. |
| 2016/0080253 A1 | 3/2016 | Wang et al. |
| 2016/0087888 A1 | 3/2016 | Jain et al. |
| 2016/0094384 A1 | 3/2016 | Jain et al. |
| 2016/0094389 A1 | 3/2016 | Jain et al. |
| 2016/0094451 A1 | 3/2016 | Jain et al. |
| 2016/0094452 A1 | 3/2016 | Jain et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094457 A1 | 3/2016 | Jain et al. |
| 2016/0094631 A1 | 3/2016 | Jain et al. |
| 2016/0094632 A1 | 3/2016 | Jain et al. |
| 2016/0094633 A1 | 3/2016 | Jain et al. |
| 2016/0094642 A1 | 3/2016 | Jain et al. |
| 2016/0094643 A1 | 3/2016 | Jain et al. |
| 2016/0094661 A1 | 3/2016 | Jain et al. |
| 2016/0099948 A1 | 4/2016 | Ott et al. |
| 2016/0105333 A1 | 4/2016 | Lenglet et al. |
| 2016/0119226 A1 | 4/2016 | Guichard et al. |
| 2016/0127306 A1 | 5/2016 | Wang et al. |
| 2016/0127564 A1 | 5/2016 | Sharma et al. |
| 2016/0134528 A1 | 5/2016 | Lin et al. |
| 2016/0149784 A1 | 5/2016 | Zhang et al. |
| 2016/0149816 A1 | 5/2016 | Roach et al. |
| 2016/0149828 A1 | 5/2016 | Vijayan et al. |
| 2016/0162320 A1* | 6/2016 | Singh ................ G06F 9/45533 718/1 |
| 2016/0164776 A1 | 6/2016 | Biancaniello |
| 2016/0164787 A1 | 6/2016 | Roach et al. |
| 2016/0164826 A1 | 6/2016 | Riedel et al. |
| 2016/0173373 A1 | 6/2016 | Guichard et al. |
| 2016/0182684 A1 | 6/2016 | Connor et al. |
| 2016/0197831 A1 | 7/2016 | Foy et al. |
| 2016/0197839 A1 | 7/2016 | Li et al. |
| 2016/0205015 A1 | 7/2016 | Halligan et al. |
| 2016/0212048 A1 | 7/2016 | Kaempfer et al. |
| 2016/0212237 A1 | 7/2016 | Nishijima |
| 2016/0218918 A1 | 7/2016 | Chu et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0248685 A1 | 8/2016 | Pignataro et al. |
| 2016/0277210 A1 | 9/2016 | Lin et al. |
| 2016/0277294 A1 | 9/2016 | Akiyoshi |
| 2016/0294612 A1 | 10/2016 | Ravinoothala et al. |
| 2016/0294933 A1 | 10/2016 | Hong et al. |
| 2016/0294935 A1 | 10/2016 | Hong et al. |
| 2016/0308758 A1 | 10/2016 | Li et al. |
| 2016/0308961 A1 | 10/2016 | Rao |
| 2016/0337189 A1 | 11/2016 | Liebhart et al. |
| 2016/0337249 A1 | 11/2016 | Zhang et al. |
| 2016/0337317 A1 | 11/2016 | Hwang et al. |
| 2016/0344565 A1 | 11/2016 | Batz et al. |
| 2016/0344621 A1 | 11/2016 | Roeland et al. |
| 2016/0344803 A1 | 11/2016 | Batz et al. |
| 2016/0352866 A1 | 12/2016 | Gupta et al. |
| 2016/0366046 A1 | 12/2016 | Anantharam et al. |
| 2016/0373364 A1 | 12/2016 | Yokota |
| 2016/0378537 A1 | 12/2016 | Zou |
| 2016/0380812 A1 | 12/2016 | Chanda et al. |
| 2017/0005882 A1 | 1/2017 | Tao et al. |
| 2017/0005920 A1 | 1/2017 | Previdi et al. |
| 2017/0005923 A1 | 1/2017 | Babakian |
| 2017/0005988 A1 | 1/2017 | Bansal et al. |
| 2017/0019303 A1 | 1/2017 | Swamy et al. |
| 2017/0019329 A1 | 1/2017 | Kozat et al. |
| 2017/0019331 A1 | 1/2017 | Yong |
| 2017/0019341 A1 | 1/2017 | Huang et al. |
| 2017/0026417 A1 | 1/2017 | Ermagan et al. |
| 2017/0033939 A1 | 2/2017 | Bragg et al. |
| 2017/0063683 A1 | 3/2017 | Li et al. |
| 2017/0063928 A1 | 3/2017 | Jain et al. |
| 2017/0064048 A1 | 3/2017 | Pettit et al. |
| 2017/0064749 A1 | 3/2017 | Jain et al. |
| 2017/0078176 A1 | 3/2017 | Lakshmikantha et al. |
| 2017/0078961 A1 | 3/2017 | Rabii et al. |
| 2017/0093698 A1 | 3/2017 | Farmanbar |
| 2017/0093758 A1 | 3/2017 | Chanda |
| 2017/0099194 A1 | 4/2017 | Wei |
| 2017/0126497 A1 | 5/2017 | Dubey et al. |
| 2017/0126522 A1 | 5/2017 | McCann et al. |
| 2017/0126726 A1 | 5/2017 | Han |
| 2017/0134538 A1 | 5/2017 | Mahkonen et al. |
| 2017/0142012 A1 | 5/2017 | Thakkar et al. |
| 2017/0147399 A1 | 5/2017 | Cropper et al. |
| 2017/0149582 A1 | 5/2017 | Cohn et al. |
| 2017/0149675 A1 | 5/2017 | Yang |
| 2017/0149680 A1 | 5/2017 | Liu et al. |
| 2017/0163531 A1 | 6/2017 | Kumar et al. |
| 2017/0163724 A1 | 6/2017 | Puri et al. |
| 2017/0171159 A1 | 6/2017 | Kumar et al. |
| 2017/0180240 A1 | 6/2017 | Kern et al. |
| 2017/0195255 A1 | 7/2017 | Pham et al. |
| 2017/0208000 A1 | 7/2017 | Bosch et al. |
| 2017/0208011 A1 | 7/2017 | Bosch et al. |
| 2017/0208532 A1 | 7/2017 | Zhou |
| 2017/0214627 A1 | 7/2017 | Zhang et al. |
| 2017/0220306 A1 | 8/2017 | Price et al. |
| 2017/0230333 A1 | 8/2017 | Glazemakers et al. |
| 2017/0230467 A1 | 8/2017 | Salgueiro et al. |
| 2017/0237656 A1 | 8/2017 | Gage |
| 2017/0250869 A1 | 8/2017 | Voellmy |
| 2017/0250902 A1 | 8/2017 | Rasanen et al. |
| 2017/0250917 A1 | 8/2017 | Ruckstuhl et al. |
| 2017/0251065 A1 | 8/2017 | Furr et al. |
| 2017/0257432 A1 | 9/2017 | Fu et al. |
| 2017/0264677 A1 | 9/2017 | Li |
| 2017/0273099 A1 | 9/2017 | Zhang et al. |
| 2017/0279938 A1 | 9/2017 | You et al. |
| 2017/0295021 A1 | 10/2017 | Gutiérrez et al. |
| 2017/0295033 A1 | 10/2017 | Cherian et al. |
| 2017/0295100 A1 | 10/2017 | Hira et al. |
| 2017/0310588 A1 | 10/2017 | Zuo |
| 2017/0310611 A1 | 10/2017 | Kumar et al. |
| 2017/0317887 A1 | 11/2017 | Dwaraki et al. |
| 2017/0317926 A1 | 11/2017 | Penno et al. |
| 2017/0317936 A1 | 11/2017 | Swaminathan et al. |
| 2017/0317954 A1 | 11/2017 | Masurekar et al. |
| 2017/0318081 A1 | 11/2017 | Hopen et al. |
| 2017/0318097 A1 | 11/2017 | Drew et al. |
| 2017/0324651 A1 | 11/2017 | Penno et al. |

(56) References Cited

U.S. PATENT DOCUMENTS

| | | |
|---|---|---|
| 2017/0324654 A1 | 11/2017 | Previdi et al. |
| 2017/0331672 A1 | 11/2017 | Fedyk et al. |
| 2017/0339110 A1 | 11/2017 | Ni |
| 2017/0339600 A1 | 11/2017 | Roeland et al. |
| 2017/0346764 A1 | 11/2017 | Tan et al. |
| 2017/0353387 A1 | 12/2017 | Kwak et al. |
| 2017/0359252 A1 | 12/2017 | Kumar et al. |
| 2017/0364794 A1 | 12/2017 | Mahkonen et al. |
| 2017/0366605 A1 | 12/2017 | Chang et al. |
| 2017/0373990 A1 | 12/2017 | Jeuk et al. |
| 2018/0004954 A1 | 1/2018 | Liguori et al. |
| 2018/0006935 A1 | 1/2018 | Mutnuru et al. |
| 2018/0026911 A1 | 1/2018 | Anholt et al. |
| 2018/0027101 A1 | 1/2018 | Kumar et al. |
| 2018/0041425 A1 | 2/2018 | Zhang |
| 2018/0041470 A1 | 2/2018 | Schultz et al. |
| 2018/0041524 A1 | 2/2018 | Reddy et al. |
| 2018/0063018 A1 | 3/2018 | Bosch et al. |
| 2018/0063087 A1 | 3/2018 | Hira et al. |
| 2018/0091420 A1 | 3/2018 | Drake et al. |
| 2018/0102919 A1 | 4/2018 | Hao et al. |
| 2018/0102965 A1 | 4/2018 | Hari et al. |
| 2018/0115471 A1 | 4/2018 | Curcio et al. |
| 2018/0123950 A1 | 5/2018 | Garg et al. |
| 2018/0124061 A1* | 5/2018 | Raman .................. H04L 63/102 |
| 2018/0139098 A1 | 5/2018 | Sunavala et al. |
| 2018/0145899 A1 | 5/2018 | Rao |
| 2018/0159733 A1 | 6/2018 | Poon et al. |
| 2018/0159801 A1 | 6/2018 | Rajan et al. |
| 2018/0159943 A1 | 6/2018 | Poon et al. |
| 2018/0176177 A1 | 6/2018 | Bichot et al. |
| 2018/0176294 A1 | 6/2018 | Vacaro et al. |
| 2018/0183764 A1* | 6/2018 | Gunda ................ H04L 63/0281 |
| 2018/0184281 A1 | 6/2018 | Tamagawa et al. |
| 2018/0191600 A1 | 7/2018 | Hecker et al. |
| 2018/0198692 A1 | 7/2018 | Ansari et al. |
| 2018/0198705 A1 | 7/2018 | Wang et al. |
| 2018/0198791 A1 | 7/2018 | Desai et al. |
| 2018/0203736 A1* | 7/2018 | Vyas .................... G06F 9/5038 |
| 2018/0205637 A1 | 7/2018 | Li |
| 2018/0213040 A1 | 7/2018 | Pak et al. |
| 2018/0219762 A1 | 8/2018 | Wang et al. |
| 2018/0227216 A1 | 8/2018 | Hughes |
| 2018/0234360 A1 | 8/2018 | Narayana et al. |
| 2018/0247082 A1 | 8/2018 | Durham et al. |
| 2018/0248713 A1 | 8/2018 | Zanier et al. |
| 2018/0248755 A1 | 8/2018 | Hecker et al. |
| 2018/0248790 A1 | 8/2018 | Tan et al. |
| 2018/0248986 A1 | 8/2018 | Dalal |
| 2018/0262427 A1 | 9/2018 | Jain et al. |
| 2018/0262434 A1 | 9/2018 | Koponen et al. |
| 2018/0278530 A1 | 9/2018 | Connor et al. |
| 2018/0288129 A1* | 10/2018 | Joshi ...................... H04L 43/20 |
| 2018/0295036 A1* | 10/2018 | Krishnamurthy ... G06F 11/3433 |
| 2018/0295053 A1 | 10/2018 | Leung et al. |
| 2018/0302242 A1 | 10/2018 | Hao et al. |
| 2018/0309632 A1 | 10/2018 | Kompella et al. |
| 2018/0337849 A1 | 11/2018 | Sharma et al. |
| 2018/0349212 A1 | 12/2018 | Liu et al. |
| 2018/0351874 A1 | 12/2018 | Abhigyan et al. |
| 2019/0007382 A1 | 1/2019 | Nirwal et al. |
| 2019/0020580 A1 | 1/2019 | Boutros et al. |
| 2019/0020600 A1 | 1/2019 | Zhang et al. |
| 2019/0020684 A1 | 1/2019 | Qian et al. |
| 2019/0028347 A1 | 1/2019 | Johnston et al. |
| 2019/0028384 A1 | 1/2019 | Penno et al. |
| 2019/0028577 A1 | 1/2019 | D?Souza et al. |
| 2019/0036819 A1 | 1/2019 | Kancherla et al. |
| 2019/0068500 A1 | 2/2019 | Hira |
| 2019/0089679 A1 | 3/2019 | Kahalon et al. |
| 2019/0097838 A1 | 3/2019 | Sahoo et al. |
| 2019/0102280 A1* | 4/2019 | Caldato .................. G06F 9/505 |
| 2019/0108049 A1* | 4/2019 | Singh .................... G06F 9/5005 |
| 2019/0116063 A1 | 4/2019 | Bottorff et al. |
| 2019/0121961 A1* | 4/2019 | Coleman ............. H04L 63/0227 |
| 2019/0124096 A1 | 4/2019 | Ahuja et al. |
| 2019/0132220 A1 | 5/2019 | Boutros et al. |
| 2019/0132221 A1 | 5/2019 | Boutros et al. |
| 2019/0140863 A1 | 5/2019 | Nainar et al. |
| 2019/0140947 A1 | 5/2019 | Zhuang et al. |
| 2019/0140950 A1 | 5/2019 | Zhuang et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0166045 A1 | 5/2019 | Peng et al. |
| 2019/0173778 A1 | 6/2019 | Faseela et al. |
| 2019/0173850 A1 | 6/2019 | Jain et al. |
| 2019/0173851 A1 | 6/2019 | Jain et al. |
| 2019/0222538 A1 | 7/2019 | Yang et al. |
| 2019/0229937 A1 | 7/2019 | Nagarajan et al. |
| 2019/0230126 A1 | 7/2019 | Kumar et al. |
| 2019/0238363 A1 | 8/2019 | Boutros et al. |
| 2019/0238364 A1 | 8/2019 | Boutros et al. |
| 2019/0268384 A1 | 8/2019 | Hu et al. |
| 2019/0286475 A1* | 9/2019 | Mani .................. G06F 9/45558 |
| 2019/0288915 A1 | 9/2019 | Denyer et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0342175 A1 | 11/2019 | Wan et al. |
| 2019/0377604 A1* | 12/2019 | Cybulski ............... G06F 9/5072 |
| 2019/0379578 A1* | 12/2019 | Mishra ............... H04L 41/5051 |
| 2019/0379579 A1* | 12/2019 | Mishra .................... H04L 67/51 |
| 2020/0007388 A1 | 1/2020 | Johnston et al. |
| 2020/0036629 A1 | 1/2020 | Roeland et al. |
| 2020/0059761 A1 | 2/2020 | Li et al. |
| 2020/0067828 A1 | 2/2020 | Liu et al. |
| 2020/0073739 A1* | 3/2020 | Rungta ..................... G06F 8/60 |
| 2020/0076684 A1 | 3/2020 | Naveen et al. |
| 2020/0076734 A1 | 3/2020 | Naveen et al. |
| 2020/0084141 A1 | 3/2020 | Bengough et al. |
| 2020/0136960 A1 | 4/2020 | Jeuk et al. |
| 2020/0145331 A1 | 5/2020 | Bhandari et al. |
| 2020/0162318 A1 | 5/2020 | Patil et al. |
| 2020/0162352 A1 | 5/2020 | Jorgenson et al. |
| 2020/0183724 A1 | 6/2020 | Shevade et al. |
| 2020/0195711 A1 | 6/2020 | Abhigyan et al. |
| 2020/0204492 A1 | 6/2020 | Sarva et al. |
| 2020/0213366 A1 | 7/2020 | Hong et al. |
| 2020/0220805 A1 | 7/2020 | Dhanabalan |
| 2020/0272493 A1 | 8/2020 | Lecuyer et al. |
| 2020/0272494 A1 | 8/2020 | Gokhale et al. |
| 2020/0272495 A1 | 8/2020 | Rolando et al. |
| 2020/0272496 A1 | 8/2020 | Mundaragi et al. |
| 2020/0272497 A1 | 8/2020 | Kavathia et al. |
| 2020/0272498 A1 | 8/2020 | Mishra et al. |
| 2020/0272499 A1 | 8/2020 | Feng et al. |
| 2020/0272500 A1 | 8/2020 | Feng et al. |
| 2020/0272501 A1 | 8/2020 | Chalvadi et al. |
| 2020/0274757 A1 | 8/2020 | Rolando et al. |
| 2020/0274769 A1 | 8/2020 | Naveen et al. |
| 2020/0274778 A1 | 8/2020 | Lecuyer et al. |
| 2020/0274779 A1 | 8/2020 | Rolando et al. |
| 2020/0274795 A1 | 8/2020 | Rolando et al. |
| 2020/0274801 A1 | 8/2020 | Feng et al. |
| 2020/0274808 A1 | 8/2020 | Mundaragi et al. |
| 2020/0274809 A1 | 8/2020 | Rolando et al. |
| 2020/0274810 A1 | 8/2020 | Gokhale et al. |
| 2020/0274826 A1 | 8/2020 | Mishra et al. |
| 2020/0274944 A1 | 8/2020 | Naveen et al. |
| 2020/0274945 A1 | 8/2020 | Rolando et al. |
| 2020/0287962 A1 | 9/2020 | Mishra et al. |
| 2020/0322271 A1 | 10/2020 | Jain et al. |
| 2020/0344088 A1 | 10/2020 | Selvaraj et al. |
| 2020/0358696 A1 | 11/2020 | Hu et al. |
| 2020/0364074 A1* | 11/2020 | Gunda ................ H04L 63/0263 |
| 2020/0366526 A1 | 11/2020 | Boutros et al. |
| 2020/0366584 A1 | 11/2020 | Boutros et al. |
| 2020/0382412 A1 | 12/2020 | Chandrappa et al. |
| 2020/0382420 A1 | 12/2020 | Suryanarayana et al. |
| 2020/0389401 A1 | 12/2020 | Enguehard et al. |
| 2021/0004245 A1 | 1/2021 | Kamath et al. |
| 2021/0011812 A1* | 1/2021 | Mitkar ................ G06F 11/1461 |
| 2021/0011816 A1* | 1/2021 | Mitkar ................ G06F 11/3409 |

(56) References Cited

U.S. PATENT DOCUMENTS

| | | |
|---|---|---|
| 2021/0029088 A1 | 1/2021 | Mayya et al. |
| 2021/0044502 A1 | 2/2021 | Boutros et al. |
| 2021/0073736 A1* | 3/2021 | Alawi ............... G06Q 10/06315 |
| 2021/0117217 A1 | 4/2021 | Croteau et al. |
| 2021/0120080 A1 | 4/2021 | Mishra et al. |
| 2021/0135992 A1 | 5/2021 | Tidemann et al. |
| 2021/0136140 A1 | 5/2021 | Tidemann et al. |
| 2021/0136141 A1 | 5/2021 | Tidemann et al. |
| 2021/0136147 A1* | 5/2021 | Giassa ............... H04L 12/2814 |
| 2021/0218587 A1 | 7/2021 | Mishra et al. |
| 2021/0227041 A1 | 7/2021 | Sawant et al. |
| 2021/0227042 A1 | 7/2021 | Sawant et al. |
| 2021/0240734 A1* | 8/2021 | Shah .................... G06F 9/5072 |
| 2021/0266295 A1* | 8/2021 | Stroz ................. H04L 63/0263 |
| 2021/0271565 A1* | 9/2021 | Bhavanarushi ..... G06F 11/1464 |
| 2021/0306240 A1 | 9/2021 | Boutros et al. |
| 2021/0311758 A1* | 10/2021 | Cao .......................... G06F 8/70 |
| 2021/0311772 A1 | 10/2021 | Mishra et al. |
| 2021/0314248 A1 | 10/2021 | Rolando et al. |
| 2021/0314252 A1 | 10/2021 | Rolando et al. |
| 2021/0314253 A1 | 10/2021 | Rolando et al. |
| 2021/0314268 A1 | 10/2021 | Rolando et al. |
| 2021/0314277 A1 | 10/2021 | Rolando et al. |
| 2021/0314310 A1* | 10/2021 | Cao .................... G06F 21/6218 |
| 2021/0314415 A1 | 10/2021 | Rolando et al. |
| 2021/0314423 A1 | 10/2021 | Rolando et al. |
| 2021/0328913 A1 | 10/2021 | Nainar et al. |
| 2021/0349767 A1* | 11/2021 | Asayag ................. G06F 9/5077 |
| 2021/0359945 A1 | 11/2021 | Jain et al. |
| 2021/0377160 A1 | 12/2021 | Faseela |
| 2022/0019698 A1 | 1/2022 | Durham et al. |
| 2022/0030058 A1 | 1/2022 | Tidemann et al. |
| 2022/0038310 A1* | 2/2022 | Boutros .................. H04L 45/76 |
| 2022/0060467 A1 | 2/2022 | Montgomery et al. |
| 2022/0078037 A1 | 3/2022 | Mishra et al. |

FOREIGN PATENT DOCUMENTS

| | | | |
|---|---|---|---|
| CN | 101594358 A | 12/2009 | |
| CN | 101729412 A | 6/2010 | |
| CN | 103516807 A | 1/2014 | |
| CN | 103795805 A | 5/2014 | |
| CN | 104471899 A | 3/2015 | |
| CN | 104521195 A | 4/2015 | |
| CN | 107078950 A | 8/2017 | |
| CN | 107204941 A | 9/2017 | |
| CN | 109213573 A * | 1/2019 | |
| CN | 110521169 A | 11/2019 | |
| CN | 107105061 B * | 9/2020 | ............. H04L 61/10 |
| CN | 112181632 A * | 1/2021 | ......... G06F 9/44505 |
| EP | 2426956 A1 | 3/2012 | |
| EP | 2466985 A1 | 6/2012 | |
| EP | 3210345 A1 | 8/2017 | |
| EP | 3300319 A1 | 3/2018 | |
| JP | 2005311863 A | 11/2005 | |
| JP | 2015519822 A | 7/2015 | |
| WO | 9918534 A2 | 4/1999 | |
| WO | 2008095010 A1 | 8/2008 | |
| WO | WO-2008140715 A1 * | 11/2008 | ............. A01G 9/108 |
| WO | 2014069978 A1 | 5/2014 | |
| WO | 2014182529 A1 | 11/2014 | |
| WO | 2016053373 A1 | 4/2016 | |
| WO | 2016054272 A1 | 4/2016 | |
| WO | 2019084066 A1 | 5/2019 | |
| WO | 2019147316 A1 | 8/2019 | |
| WO | WO-2019157955 A1 * | 8/2019 | ......... H04L 63/0876 |
| WO | WO-2019168532 A1 * | 9/2019 | .......... G06F 11/3409 |
| WO | 2019226327 A1 | 11/2019 | |
| WO | 2020046686 A1 | 3/2020 | |
| WO | 2020171937 A1 | 8/2020 | |
| WO | WO-2021041440 A1 * | 3/2021 | ............. G06F 9/455 |
| WO | 2021086462 A1 | 5/2021 | |
| WO | WO-2021086462 A1 * | 5/2021 | ........... H04L 45/021 |
| WO | 2021206789 A1 | 10/2021 | |

OTHER PUBLICATIONS

Author Unknown, "AppLogic Features," Jul. 2007, 2 pages. 3TERA, Inc.

Author Unknown, "Enabling Service Chaining on Cisco Nexus 1000V Series," Month Unknown, 2012, 25 pages, Cisco.

Casado, Martin, et al., "Virtualizing the Network Forwarding Plane," Dec. 2010, 6 pages.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., (U.S. Appl. No. 61/514,990), filed Aug. 4, 2011, 31 pages.

Greenberg, Albert, et al., "VL2: A Scalable and Flexible Data Center Network," SIGCOMM '09, Aug. 17-21, 2009, 12 pages, ACM, Barcelona, Spain.

Guichard, J., et al., "Network Service Chaining Problem Statement," Network Working Group, Jun. 13, 2013, 14 pages, Cisco Systems, Inc.

Halpern, J., et al., "Service Function Chaining (SFC) Architecture," draft-ietf-sfc-architecture-02, Sep. 20, 2014, 26 pages, IETF.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Karakus, Murat, et al., "Quality of Service (QoS) in Software Defined Networking (SDN): A Survey," Journal of Network and Computer Applications, Dec. 9, 2016, 19 pages, vol. 80, Elsevier, Ltd.

Kumar, S., et al., "Service Function Chaining Use Cases in Data Centers," draft-ietf-sfc-dc-use-cases-01, Jul. 21, 2014, 23 pages, IETF.

Liu, W., et al., "Service Function Chaining (SFC) Use Cases," draft-liu-sfc-use-cases-02, Feb. 13, 2014, 17 pages, IETF.

Non-Published Commonly Owned U.S. Appl. No. 16/668,477, filed Oct. 30, 2019, 31 pages, VMware, Inc.

Non-Published Commonly Owned U.S. Appl. No. 16/668,485, filed Oct. 30, 2019, 55 pages, VMware, Inc.

Non-Published Commonly Owned U.S. Appl. No. 16/668,505, filed Oct. 30, 2019, 39 pages, VMware, Inc.

Non-Published Commonly Owned U.S. Appl. No. 16/741,544, filed Jan. 13, 2020, 31 pages, VMware, Inc.

Non-Published Commonly Owned U.S. Appl. No. 16/785,674, filed Feb. 10, 2020, 29 pages, VMware, Inc.

Non-Published Commonly Owned U.S. Appl. No. 16/843,913, filed Apr. 9, 2020, 119 pages, VMware, Inc.

Non-Published Commonly Owned U.S. Appl. No. 16/843,919, filed Apr. 9, 2020, 123 pages, VMware, Inc.

Non-Published Commonly Owned U.S. Appl. No. 16/904,377, filed Jun. 17, 2020, 120 pages, VMware, Inc.

Non-Published Commonly Owned U.S. Appl. No. 16/904,390, filed Jun. 17, 2020, 121 pages, VMware, Inc.

Non-Published Commonly Owned U.S. Appl. No. 16/904,399, filed Jun. 17, 2020, 121 pages, VMware, Inc.

Non-Published Commonly Owned U.S. Appl. No. 16/904,430, filed Jun. 17, 2020, 120 pages, VMware, Inc.

Non-Published Commonly Owned U.S. Appl. No. 16/904,437, filed Jun. 17, 2020, 121 pages, VMware, Inc.

Non-Published Commonly Owned U.S. Appl. No. 16/904,442, filed Jun. 17, 2020, 121 pages, VMware, Inc.

Non-Published Commonly Owned U.S. Appl. No. 16/904,446, filed Jun. 17, 2020, 121 pages, VMware, Inc.

Non-Published Commonly Owned Related U.S. Appl. No. 17/122,192 with similar specification, filed Dec. 15, 2020, 33 pages, VMware, Inc.

Salsano, Stefano, et al., "Generalized Virtual Networking: An Enabler for Service Centric Networking and Networt Function Virtualization," 2014 16th International Telecommunications Network Strategy and Planning Symposium, Sep. 17-19, 2014, 7 pages, IEEE, Funchal, Portugal.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

(56) References Cited

OTHER PUBLICATIONS

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Siasi, N., et al., "Container-Based Service Function Chain Mapping," 2019 SoutheastCon, Apr. 11-14, 2019, 6 pages, IEEE, Huntsville, AL, USA.

Lin, Po-Ching, et al., "Balanced Service Chaining in Software-Defined Networks with Network Function Virtualization," Computer: Research Feature, Nov. 2016, 9 pages, vol. 49, No. 11, IEEE.

Non-Published Commonly Owned U.S. Appl. No. 17/346,255, filed Jun. 13, 2021, 49 pages, Nicira, Inc.

Non-Published Commonly Owned U.S. Appl. No. 17/352,298, filed Jun. 19, 2021, 132 pages, VMware, Inc.

Non-Published Commonly Owned U.S. Appl. No. 17/385,809, filed Jul. 26, 2021, 74 pages, Nicira, Inc.

Halpern, J., et al., "Service Function Chaining (SFC) Architecture," RFC 7665, Oct. 2015, 32 pages, IETF Trust.

Non-Published Commonly Owned U.S. Appl. No. 17/492,626, filed Oct. 3, 2021, 63 pages, VMware, Inc.

Non-Published Commonly Owned U.S. Appl. No. 17/528,094, filed Nov. 16, 2021, 38 pages, VMware, Inc.

Xiong, Gang, et al., "A Mechanism for Configurable Network Service Chaining and Its Implementation," KSII Transactions on Internet and Information Systems, Aug. 2016, 27 pages, vol. 10, No. 8, KSII.

Author Unknown, "MPLS," Mar. 3, 2008, 47 pages.

Cianfrani, Antonio, et al., "Translating Traffic Engineering Outcome into Segment Routing Paths: the Encoding Problem," 2016 IEEE Conference on Computer Communications Workshops (Infocom Wkshps): GI 2016: 9th IEEE Global Internet Symposium, Apr. 10-14, 2016, 6 pages, IEEE, San Francisco, CA, USA.

PCT International Search Report and Written Opinion of Commonly Owned International Patent Application PCT/US2021/056574, dated Feb. 8, 2022, 13 pages, International Searching Authority (EPO).

\* cited by examiner

PROVIDING STATEFUL SERVICES IN A SCALABLE MANNER FOR MACHINES EXECUTING ON HOST COMPUTERS

BACKGROUND

Sidecar containers have become popular for micro-services applications, which have one application implemented by many different application components each of which is typically implemented by an individual container. Sidecar containers are often deployed in series with forwarding across the individual service containers. One example is a service mesh that has a proxy container deployed in front of a web server container or application server container to handle services such as authentication, service discovery, encryption, or load balancing. The web server or application server container is configured to send its traffic to the sidecar proxy. In the return path, the sidecar proxy receives the packet and sends the packet to the web server or application server container.

These services and their orders are fixed and have to be deployed when the web server or application server container is deployed and essentially operates in a non-transparent mode, i.e., the web server or application server container is configured to forward packets to the sidecar proxy. Mobility of such a container is also restricted because of its dependency on the attached sidecar proxy. Moreover, for virtual machines (VMs) running legacy applications, deployment of inline services (e.g., load balancing, intrusion detection system, layer 7 firewall, etc.) in these architectures is still being done through middleboxes as it is not possible or recommended to touch any part of the VM image.

BRIEF SUMMARY

Some embodiments provide a method for performing services on a host computer that executes several machines (e.g., virtual machines (VMs), Pods, containers, etc.) in a datacenter. The method configures a first set of one or more service containers for a first machine executing on the host computer, and a second set of one or more service containers for a second machine executing on the host computer. Each configured service container performs a service operation (e.g., a middlebox service operation, such as firewall, load balancing, encryption, etc.) on data messages associated with a particular machine (e.g., on ingress and/or egress data messages to and/or from the particular machine).

For each particular machine, the method also configures a module along the particular machine's datapath (e.g., ingress and/or egress datapath) to identify a subset of service operations to perform on a set of data messages associated with the particular machine, and to direct the set of data messages to a set of service containers configured for the particular machine to perform the identified set of service operations on the set of data messages. In some embodiments, the first and second machines are part of one logical network or one virtual private cloud (VPC) that is deployed over a common physical network in the datacenter.

The first and second sets of containers in some embodiments can be identical sets of containers (i.e., perform the same middlebox service operations), or can be different sets of containers (i.e., one set of containers performs a middlebox service operation not performed by the other set of containers. In some embodiments, the first and second sets of containers respectively operate on first and second Pods. In other embodiments, each container operates on its own dedicated Pod. In still other embodiments, at least two containers in one set of containers execute on two different Pods, but at least one Pod executes two or more containers in the same container set.

Each Pod in some embodiments executes (i.e., operates) on a service virtual machine (SVM) in some embodiments. For instance, in some embodiments, the first set of containers execute on a first Pod that executes on a first SVM on the host computer, while the second set of containers execute on a second Pod that executes on a second SVM on the host computer. In some embodiments, the first and second machines are first and second guest virtual machines (GVMs) or first and second guest containers. In some embodiments where the first and second machines are first and second GVMs, the SVMs on which the Pods execute are lighter weight VMs (e.g., consume less storage resources and have faster bootup times) than the GVMs. Also, these SVMs in some embodiments support a smaller set of standard specified network interface drivers, while the GVMs support a larger set of network interface drivers.

In some embodiments, the first and second sets of containers (e.g., the first and second Pods) are respectively configured when the first and second machines are configured on the host computer. Each container set in some embodiments is deployed on the host computer when the set's associated machine is deployed. Alternatively, in other embodiments, the containers and/or machines are pre-deployed on the host computer, but the containers are configured for their respective machine when the machines are configured for a particular logical network or VPC.

In some embodiments, the first and second sets of containers (e.g., the first and second Pods) are terminated when the first and second machines are respectively terminated on the host computer. Also, in some embodiments, the first and second sets of containers (e.g., the first and second Pods) are defined to be part of a resource group of their respective first and second machines. This allows each service container set (e.g., each Pod) to migrate with its machine to another host computer. The migration tools that migrate the machine and its associated service container set in some embodiments not only migrate each service container in the service container set but also the service rules and connection-tracking records of the service containers.

The configured module along each machine's datapath (e.g., ingress and/or egress datapath) in some embodiments is a classifier that for each data message that passes along the datapath, identifies a subset of service operations that have to be performed on the data message, and passes the data message to a subset of service containers to perform the identified subset of service operations on the data message. In some embodiments, the module successively passes the data message to successive service containers in the subset of containers after receiving the data message from each service container in the identified subset of containers (e.g., passes the data message to a second container in the identified container subset after receiving the data message from a first container).

In other embodiments, the module passes the data message by generating a service identifier that specifies the identified subset of service operations that have to be performed on the data message by a subset of service containers, and providing the service identifier along with the data message so that the data message can be forwarded to successive service containers in the identified subset of service containers. The service operations in the subset of service operations identified by the classifier have a particular order, and the service identifier specifies the particular order. In some embodiments, a forwarding element executing on the host computer (e.g., a forwarding element executing on the Pod that executes the service containers) processes each generated service identifier in order to identify the subset of services that has to be performed on the data message for which the service identifier is generated, and to successively provide the data message to service containers in the subset of service containers to perform the identified subset of service operations.

Each particular machine's classifier in some embodiments can identify different subsets of service operations for different data message flows originating from the particular machine and/or terminating at the particular machine. In some embodiments, each particular machine's classifier is called by a port of a software forwarding element that receives the data messages associated with the particular machine.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
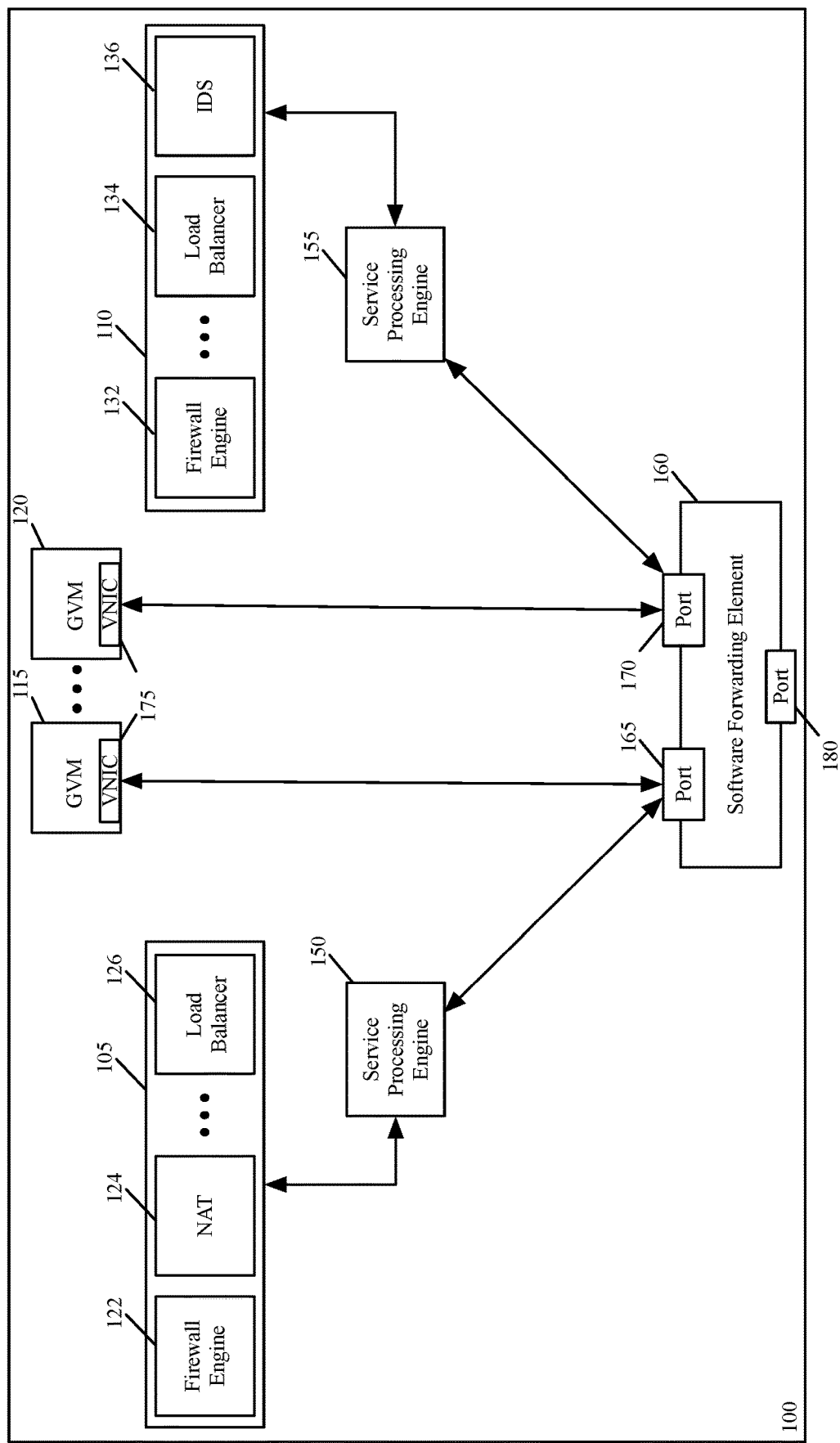
FIG. 1 illustrates an example of a host computer with two different sets of containers that perform service operations for two different guest virtual machines executing on the host computer.

Some embodiments provide a method for performing services on a host computer that executes several machines (e.g., virtual machines (VMs), Pods, containers, etc.). In some embodiments, the method uses at least two different sets of containers to perform service operations for at least two different machines executing on the same host computer. FIG. 1 illustrates an example of a host computer 100 with two different sets of containers 105 and 110 that perform service operations for two different guest virtual machines 115 and 120 executing on the host computer.

The first set of service containers 105 are configured to perform a first set of service operations for the first virtual machine 115 executing on the host computer 100, while the second set of service containers 110 are configured to perform a second set of service operations for the second virtual machine 120 executing on the host computer. In this example, the first set of service containers 105 includes firewall, network address translation (NAT), and load balancing service containers 122, 124 and 126 that perform firewall, NAT and load balancing service operations on ingressing and/or egressing data messages to and/or from the VM 115.

The second set of service containers 110 includes firewall, load balancing service, and intrusion detection system (IDS) containers 132, 134 and 136 that perform firewall, load balancing, and IDS service operations on ingressing and/or egressing data messages to and/or from the VM 120. In some embodiments, the set of service containers for each machine (e.g., for VM 115 or 120) includes other types of service containers performing other middlebox service operations (e.g., such as encryption, intrusion prevention, etc.) for one or more data message flows associated with their respective machine. The sets of containers 105 and 110 in some embodiments are identical sets of containers (i.e., include the same containers to perform the same middlebox service operations), while in other embodiments are different sets of containers (i.e., one set of containers has at least one container that is not part of the other container set and that performs one middlebox service operation not performed by the other container set).

For each particular VM 115 and 120, the host computer 100 includes a service processing engine 150 or 155 to identify different subsets of service operations to perform on different sets of data message flows associated with the particular VM, and to direct the different sets of data message flows to different sets of service containers configured for the particular machine to perform the identified sets of service operations on the set of data messages. As shown, the host computer executes a software forwarding element (SFE) 160 (e.g., a software switch) that connects the guest VMs of the host computer 100 to each other and to other VMs, machines, devices and appliances outside of the host computer 100.

The SFE has two ports 165 and 170 that connect with (i.e., communicate with) the virtual network interface card (VNIC) 1075 of the GVMs. In some embodiments, each port 165 or 170 is configured to re-direct all ingress and egress data messages to and from the port's associated VM (i.e., VM 115 for port 165, and VM 120 for port 170) to the service processing engine 150 or 155 of the VM. The SFE also has a port 180 that interfaces with a physical network interface controller (not shown) of the host computer to forward and receive all data messages exiting and entering the host computer 100.

In some embodiments, the SFE 160 implements different logical forwarding elements (e.g., multiple logical switches) for different logical networks with multiple other SFEs executing on other host computers. In some of these embodiments, each LFE spans multiple host computers that execute the SFEs that implement the LFE. In some embodiments, the VMs 115 and 120 are part of one logical network, while in other embodiments these VMs are part of two different logical networks. Other embodiments do not employ logical networks but partition the physical network of the datacenter (e.g., the IP address space of the datacenter) into segregated networks that can be treated as virtual private clouds (VPCs). In some such embodiments, the VMs 115 and 120 are part of one VPC, while in other embodiments these VMs are part of two different VPCs.

In some embodiments, each container set 105 or 110 has all of its containers operate on one Pod (i.e., the containers of set 105 execute on one Pod, while the containers of the set 110 execute on another Pod). In other embodiments, each container operates on its own dedicated Pod. In still other embodiments, at least two containers in one set of containers execute on two different Pods, but at least one Pod executes two or more containers in the same container set.

In some embodiments, a Pod is a group of one or more containers, with shared storage and network resources. A Pod typically has a specification for how to run the containers, and its contents is typically co-located and co-scheduled and run in a shared context. In some embodiments, a Pod models an application-specific "logical host," and contains one or more application containers.

Figure 2:
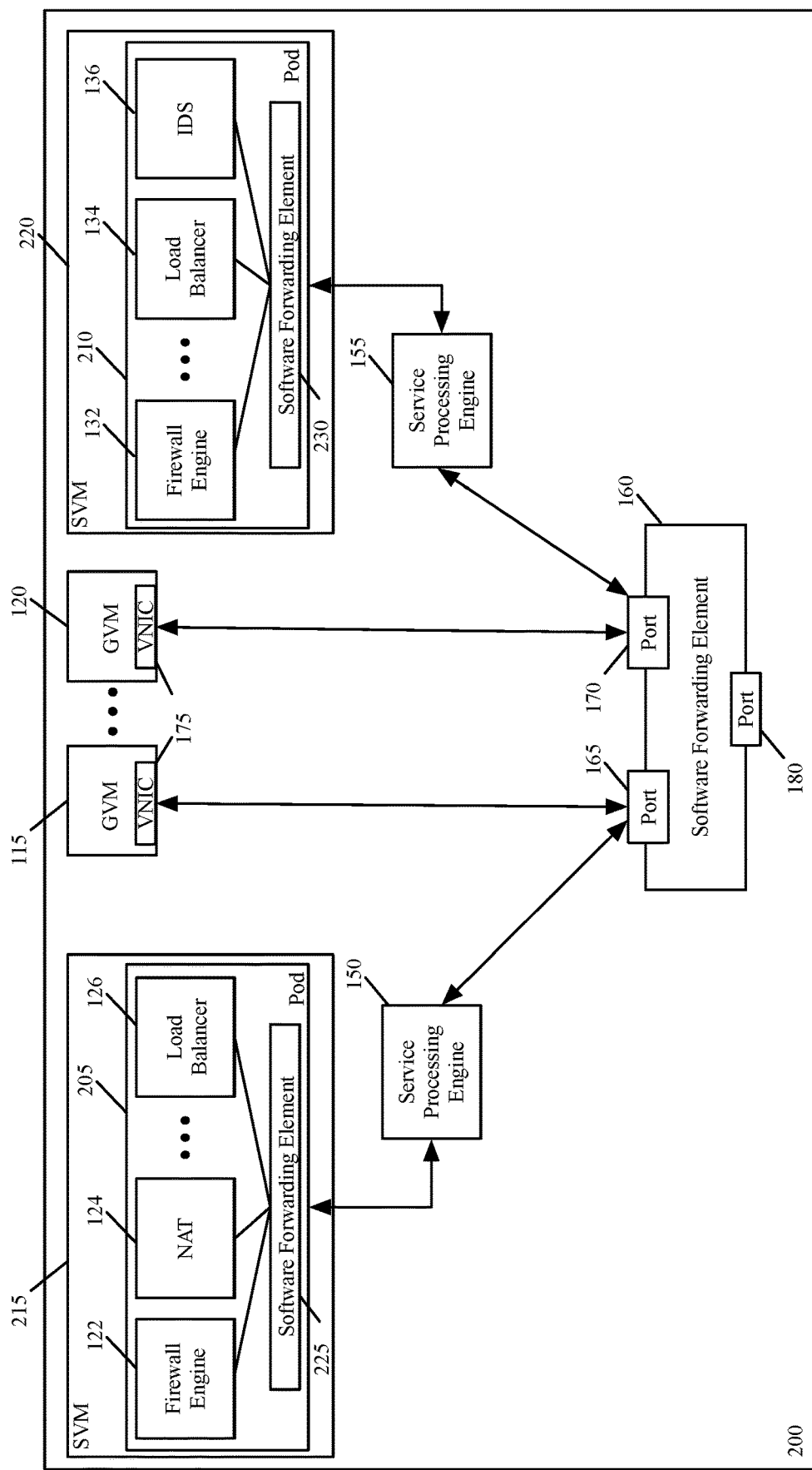
FIG. 2 illustrates an example wherein each Pod executes on a service virtual machine.

Each Pod in some embodiments executes (i.e., operates) on a service virtual machine (SVM). For instance, FIG. 2 illustrates a host computer 200 with a first set of containers that execute on a first Pod 205 that executes on a first SVM 215 on the host computer 200, while the second set of containers execute on a second Pod 210 that executes on a second SVM 220 on the host computer 200. In this example, the first set of containers includes a firewall 122, a network address translator 124, and a load balancer 126, and the second set of containers includes a firewall 132, a load balancer 134, and IDS detector 136.

In some embodiments, the SVMs 215 and 220 on which the Pods execute are lighter weight VMs (e.g., consume less storage resources and have faster bootup times) than the GVMs 105 and 110. Also, these SVMs in some embodiments support a smaller set of standard specified network interface drivers, while the GVMs support a larger set of network interface drivers. In some embodiments, each SVM has a vmxnet3 standard VNIC (not shown) through which the service processing engine 150 communicates with the SVM and its Pod.

As further described below, each Pod 205 or 210 in some embodiments includes a forwarding element 225 or 230 that (1) based on the service identifier supplied by the service processing engine 150 or 155, identifies the service containers that need to perform a service operation on a data message provided by the service processing engine 150 or 155, and (2) successively provides the data message to each identified service container.

In some embodiments, the set of containers 105 or 110 (e.g., Pod 205 or 210 with its containers) for each GVM 115 or 120 is respectively configured when the GVM 115 or 120 is configured on the host computer. Each container set in some embodiments is deployed on the host computer when the set's associated machine is deployed. Alternatively, in other embodiments, the containers (e.g., the Pods 205 or 210) and/or GVMs are pre-deployed on the host computer, but the containers are configured for their respective GVMs 115 or 120 when the GVMs 115 or 120 are configured for a particular logical network or VPC.

In some embodiments, the set of containers 105 or 110 (e.g., Pod 205 or 210 with its containers) for each GVM 115 or 120 is terminated when the GVM is respectively terminated on the host computer. Also, in some embodiments, the set of containers 105 or 110 (e.g., Pod 205 or 210 with its containers) for each GVM 115 or 120 is defined to be part of a resource group of its GVM. This allows each service container set (e.g., each Pod) to migrate with its GVM to another host computer. The migration tools that migrate the GVM and its associated service container set in some embodiments migrate the service rules and connection-tracking records of the service containers in the service container set.

As mentioned above, the service processing engine 150 or 155 of each GVM 115 or 120 identifies for a data message a subset of one or more service operations that have to be performed on that flow, and directs a subset of the service containers configured for the GVM to perform the identified subset of service operations on the data message. A subset of two or more service operations or containers are referred to below as a service chain or chain of service operations/containers.

Figure 3:
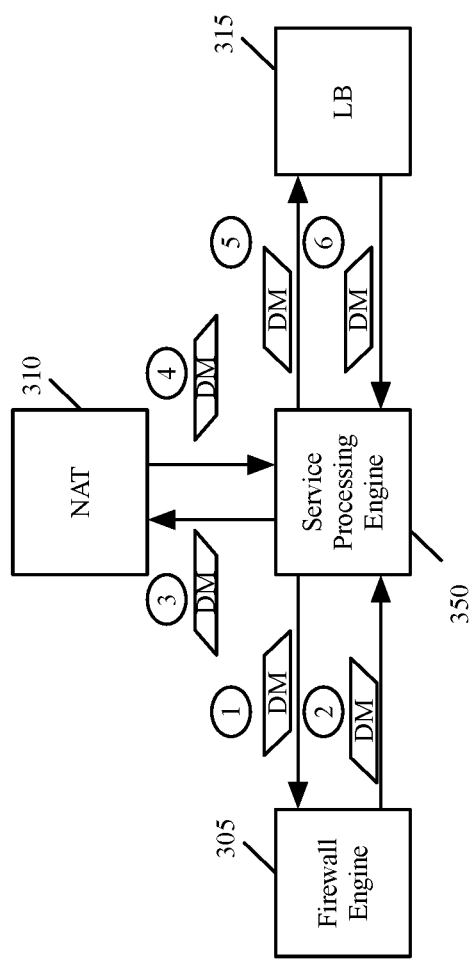
FIG. 3 illustrates a service processing engine that sequentially calls the service containers in a service chain that it identifies for a data message.

FIG. 3 illustrates that in some embodiments a service processing engine 350 sequentially calls the service containers in a service chain that it identifies for a data message. Under this approach, each service container returns the service-processed data message back to the service processing engine (assuming that the service container does not determine that the data message should be dropped). In this example, the service chain includes first a firewall operation performed by a firewall container 305, next a NAT operation performed by a NAT container 310, and last a load balancing operation performed by a load balancing container 315.

Figure 4:
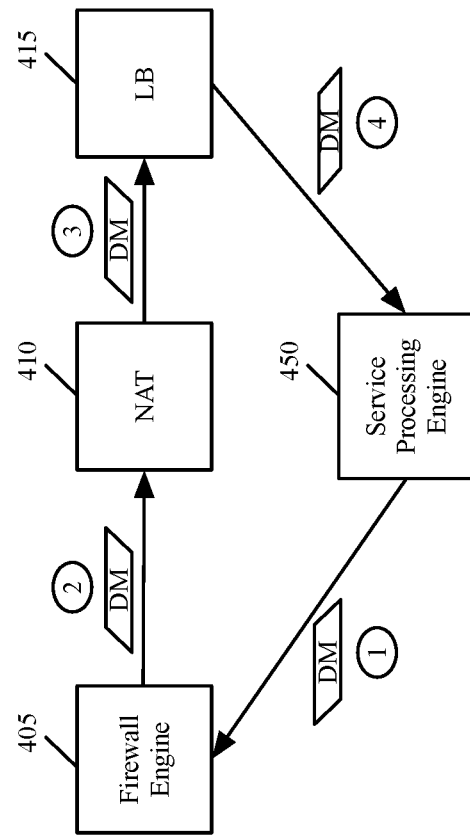
FIG. 4 illustrates a service processing engine that calls the first service container of the service chain that the service processing engine identifies for a data message.

For the same service chain as in FIG. 3, FIG. 4 illustrates that in other embodiments a service processing engine 450 calls the first service container (a firewall container 405) of the service chain that the service processing engine 450 identifies for a data message. The data message is then passed from one service container to the next service container (e.g., from the firewall container to a NAT container 410, or from NAT container 410 to the load balancing container 415) in the chain, until the last service container (in this example the load balancer 415) returns the service-processed data message to the service processing engine 450.

Different embodiments implement the data message forwarding of FIG. 4 differently. For instance, in some embodiments, each service container forwards the data message to the next service container in the service chain when there is a subsequent service container in the service chain, or back to the service processing engine when there is no subsequent service container in the service chain. In other embodiments, a service forwarding element forwards the data message to the successive service containers. For example, in the example illustrated in FIG. 2, a service SFE 225 or 230 forwards a data message received by its Pod 205 or 210 to successive service containers that are identified by the service identifier supplied by the service processing engine 150 or 155, in an order identified by this service identifier.

Figure 5:
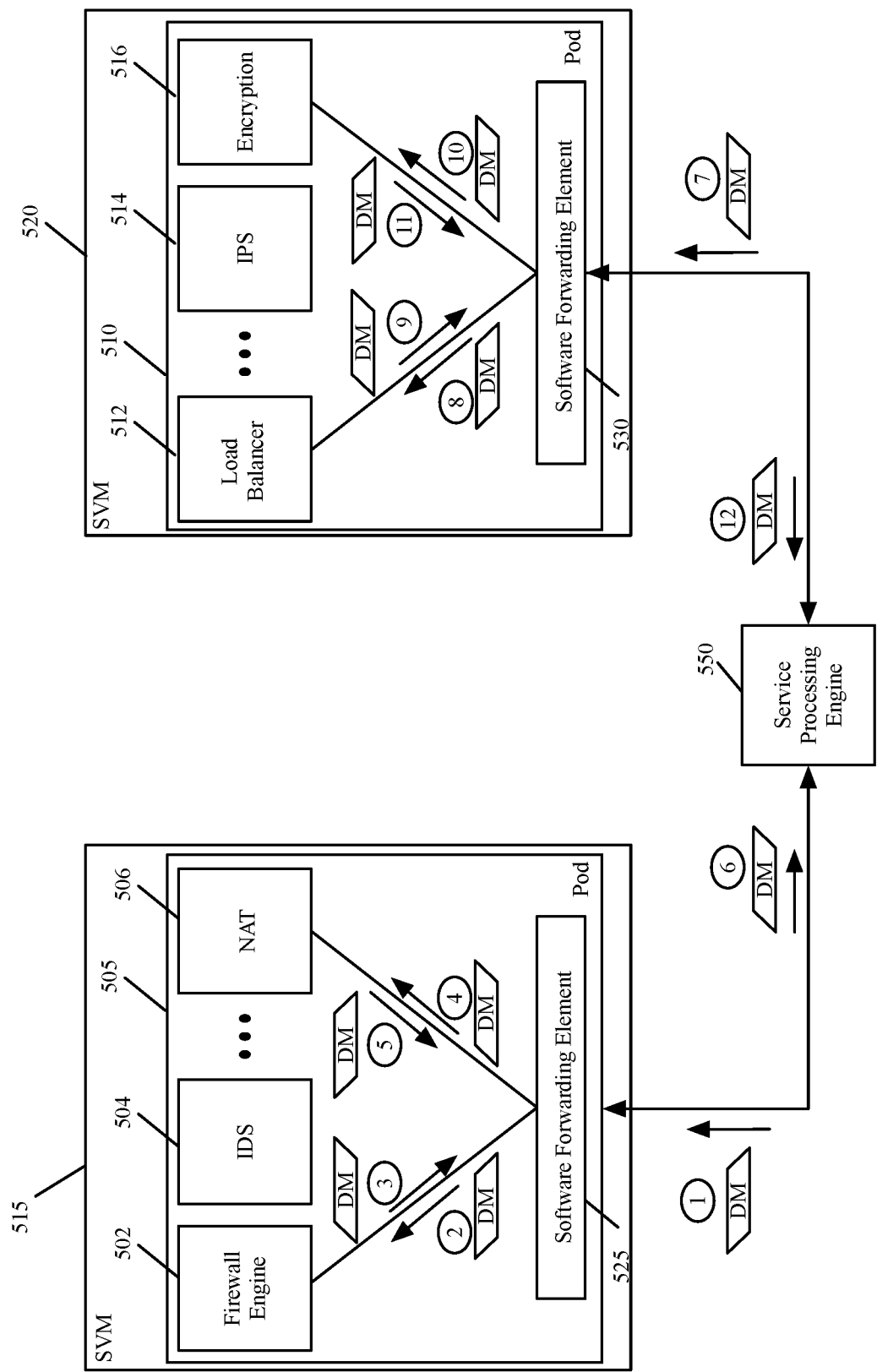
FIG. 5 illustrates how some embodiments forward data message through the service containers when the service containers are distributed across multiple Pods.

FIG. 5 illustrates how some embodiments forward data message through the service containers when the service containers are distributed across multiple Pods. As shown in this figure, each Pod's service SFE is responsible for forwarding a data message to its service containers that are on the service chain specified by the service identifier provided by the service processing engine. In this example, the service SFE 525 of Pod 505 first provides the data message to a firewall container 502 and then to a NAT container 506. The Pod 505 then returns the data message back to the service processing engine 550, which then provides the data message to Pod 510. The service SFE 530 of this Pod provides to the load balancing container 512 and then to the encryption container 516, before returning the data message back to the service processing engine 550.

In this example, the service processing engine provides the data message along with the service identifier to each Pod. In some embodiments, the service processing engine provides different service identifiers to the Pods 505 and 510 as the different Pods have to perform different service operations. In other embodiments, the service processing engine provides the same service identifier to each Pod, and each Pod's service SFE can map the provided service identifier to a group of one or more of its service containers that need to process the data message. In some of these embodiments, the service SFE or the service processing engine adjusts (e.g., increments or decrements) a next service value that specifies the next service to perform in a list of service operations identified by the service identifier. The service SFE of each Pod can then use this service value to identify the next service that has to be performed and the service container to perform this next service.

Figure 6:
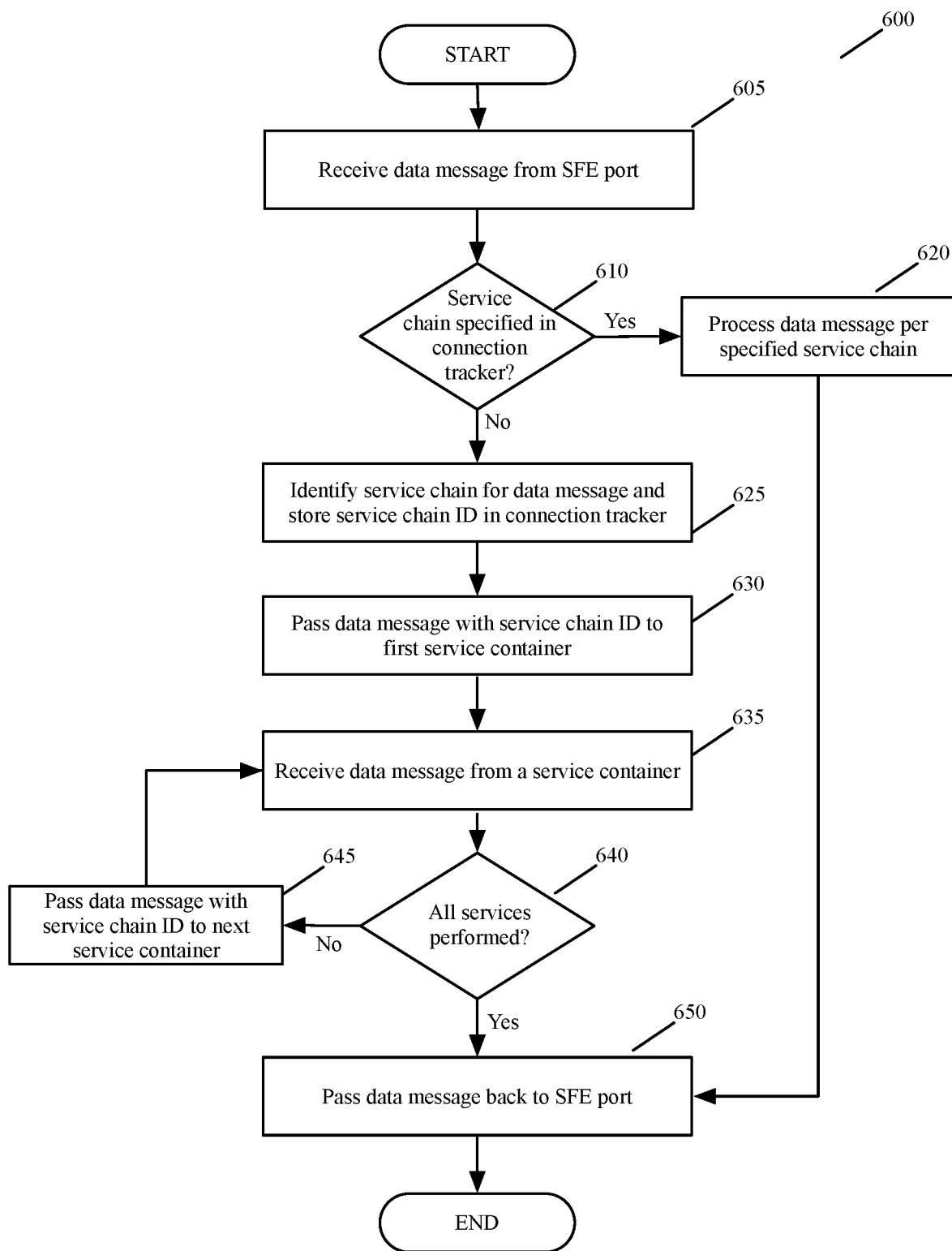
FIG. 6 illustrates a process that a service processing engine performs to identify a subset of service operations to perform on a data message associated with its GVM, and to direct the data message to a subset of service containers configured for its GVM to perform the identified subset of service operations on the data message.

FIG. 6 illustrates a process 600 that a service processing engine 150 or 155 performs in some embodiments to identify a subset of service operations to perform on a data message associated with its GVM, and to direct the data message to a subset of service containers configured for its GVM to perform the identified subset of service operations on the data message. As shown, the process 600 starts when the service processing engine is called (at 605) by its associated SFE port to process a data message received at this port. The data message in some embodiments can be an egress data message originating from the service processing engine's associated GVM, or an ingress data message destined to this GVM.

At 610, the process 600 determines whether it has a record for the received data message's flow in a connection tracking storage that the process maintains. The process 600 would have this record if it previously analyzed another data message in the same flow. For its determination at 610, the process 600 in some embodiments compares the flow identifier (e.g., the five-tuple identifier, i.e., source and destination IP addresses, source and destination ports and protocol) of the received data message with identifiers of records stored in the connection tracking storage to determine whether the connection tracking storage has a record with a record identifier that matches the flow identifier.

If not, the process 600 determines that it has not previously processed the received data message's flow, and transitions to 625 to identify a service chain for the data message and to store in the connection tracker an identifier (i.e., a service chain ID) that specifies the identified service chain. The service processing engine's connection tracker in some embodiments stores CT records that specify service chain identifiers for different data message flows processed by the service processing engine.

To identify the service chain, the process 600 in some embodiments compares the flow identifier (e.g., the five-tuple identifier) of the received data message with identifiers of service-chain specifying records stored in a service rule storage that the process 600 analyzes. Based on this comparison, the process 600 identifies a service-chain specifying record that matches the received data message (i.e., that has a record identifier that matches the data messsage's flow identifier). For different ingress/egress data message flows, the process 600 can identify the same service chain or different service chain based on the service-chain specifying records stored in the service rule storage.

Each service chain in some embodiments has an associated service chain identifier. In some of these embodiments, each service-chain specifying record stores the service chain identifier along with the identities of the service containers and/or Pods that have to perform the services in the identified service chain. In other embodiments, each service-chain specifying record specifies the identities of the service containers and/or Pods that have to perform the services, and the service chain identifier is derived from the specified identities of the service containers and/or Pods. In still other embodiments, each service-chain specifying record just stores the service chain identifier. In these embodiments, the process 600 derives the identities of the service containers and/or Pods that have to perform the services from the service chain identifier stored by the record matching the data message's flow.

Next, at 630, the process 600 passes the data message and the service identifier (that specifies a subset of service operations that have to be performed on the data message by a subset of service containers) to a service Pod that contains the first service container in the identified service chain that has to process the data message. In some embodiments, the service processing engine 150 or 155 passes data messages and their attributes to its associated service Pod(s) by using shared memory allocated by a hypervisor on which both the service processing engine and the service Pod operate.

The service operations in the service chain have to be performed in a particular order, and the service identifier specifies the particular order (e.g., the service identifier in some embodiments is associated with a lookup table record maintained by the service Pod that identifies the order of the service operations, while in other embodiments the service identifier can be deconstructed to obtain the identifiers of the successive service operations or container). As mentioned above and further described below by reference to FIG. 7, a forwarding element of the service Pod processes the service identifier in order to identify the subset of services that has to be performed on the data message for which the service identifier is generated, and to successively provide the data message to service containers in a subset of service containers to perform the identified subset of service operations.

At 635, the process 600 receives the data message from the service Pod. It then determines (at 640) whether there are any additional services in the identified service chain that still need to be performed. As mentioned above (e.g., by reference to FIG. 5), sometimes not all of the service containers for a service chain are implemented on the same service Pods. In such cases, the process 600 has to check (at 640) whether it needs to pass the data message to another service Pod to have its service container(s) process the data message.

If the process 600 determines (at 640) that additional services need to be performed, it passes the data message and the service identifier to the next service Pod that contains the next service container(s) in the identified service chain for processing the data message. In some embodiments, the service processing engine adjusts (e.g., increments or decrements) a next service value that specifies the next service to perform in a list of service operations identified by the service identifier. The service SFE of each Pod then uses this service value to identify the next service that has to be performed and the service container to perform this next service. Alternatively, in the embodiments that have each service Pod contain only one service container, the process 600 does not even need to provide a service identifier with the data message to the next service Pod, as the process 600 just handles the successive calls to the successive service containers that perform the service operations in the service chain.

When the process determines (at 640) that all of the service operations specified by the identified service chain have been performed on the data message, the process returns (at 650) the data message back to the SFE port that called it, and then ends. The process also transitions to 650 from 620 to which the process 600 transitions when it determines (at 610) that its connection tracker has a record that matches the received data message (e.g., matches the data message's flow ID). At 620, the process retrieves the service chain identifier from the matching connection tracker record, and based on this service chain identifier, performs a set of operations that are similar to the operations 625-640. Once all of these operations are completed, the process transitions to 650 to return the data message back to the SFE port that called it, and then ends.

Figure 7:
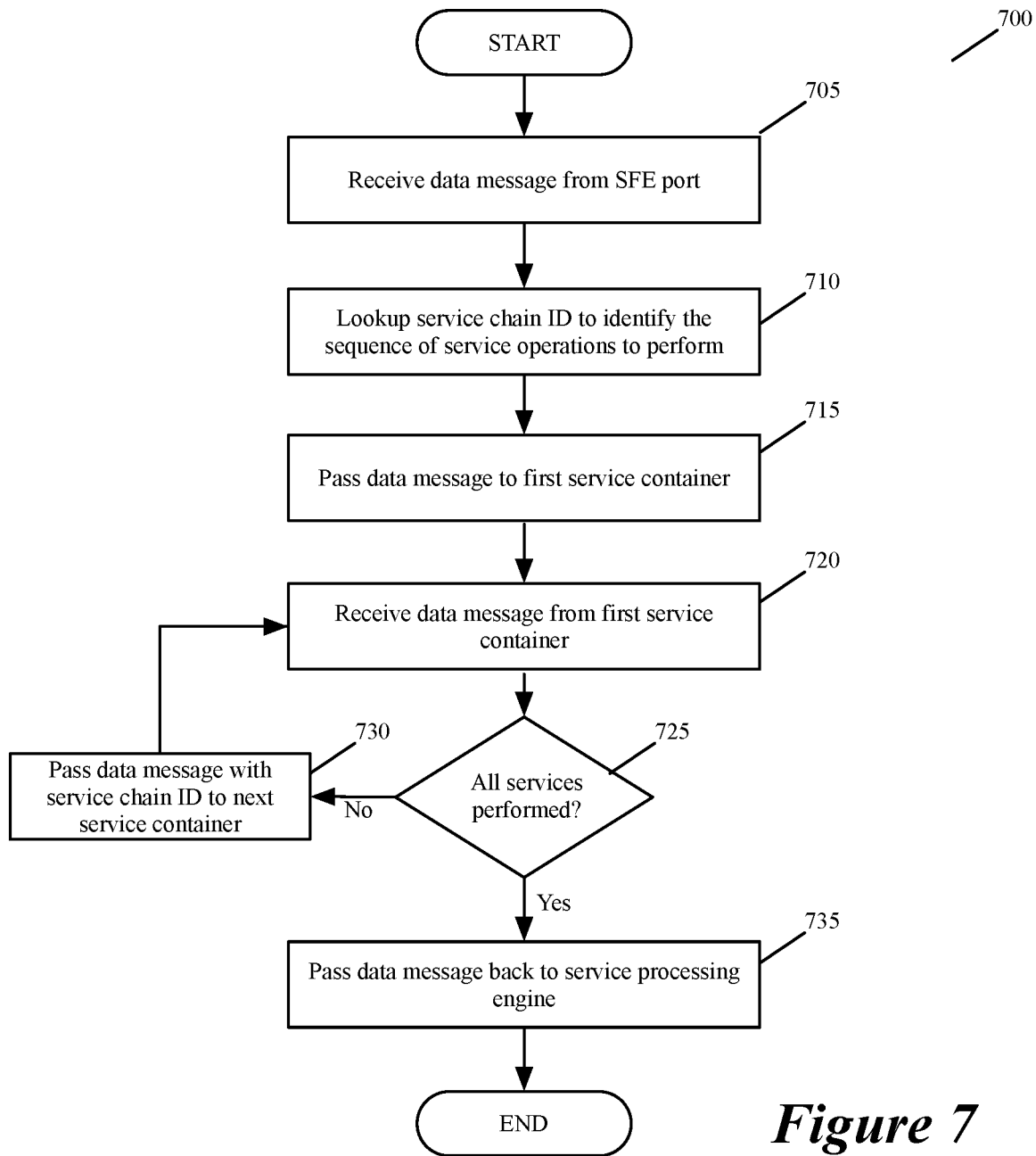
FIG. 7 illustrates a process that a service SFE performs to identify a subset of service operations to perform on a data message received from a service processing engine, and to direct the data message to a group of service containers of its Pod to perform the identified subset of service operations on the data message.

FIG. 7 illustrates a process 700 that a service SFE 225 or 230 performs in some embodiments to identify a subset of service operations to perform on a data message received from a service processing engine, and to direct the data message to a group of service containers of its Pod to perform the identified subset of service operations on the data message. As shown, the process 700 starts when the service SFE is called (at 705) to process a data message by its associated service processing engine 150 or 155. Along with this data message, the service SFE receives a service chain identifier in some embodiments.

At 710, the process 700 matches the service chain identifier with a record in a service rule storage that has several records that specify different sequences of service operations for different service chain identifiers. The matching record in some embodiments is the record that has a service chain identifier that matches the service chain identifier received with the data message. The service operations in the service chain have to be performed in a particular order. In some embodiments, the matching record identifies the order of the service operations.

The service SFE then performs operations 715-730 to successively provide the data message to service containers in a group of one or more service containers on its Pod to perform the identified group of service operations. Specifically, at 715, the process 700 passes the data message to the first service container in this group to perform its service operation on the data message. Next, at 720, the process 700 receives the data message from the service container. It then determines (at 725) whether there are any additional services in the identified group of service operations that still need to be performed.

If the process 700 determines (at 725) that additional services need to be performed, it passes (at 730) the data message to the next service container in the identified group for processing. When the process determines (at 725) that all of the service operations specified by the identified group of service containers have been performed on the data message, the process returns (at 735) the data message back to the service process engine that called it, and then ends.

In some embodiments, the service containers perform their service operations not only based on the flow identifiers of the data messages that they process, but also based on contextual attributes (e.g., attributes other than layers 2, 3 and 4 header values) associated with these data messages. For instance, for a data message, a service container in some embodiments selects a service rule that specifies the service operation to perform, by using the data message's flow attributes and one or more contextual attributes associated with the data message.

Specifically, to select the service rule, the service container in some embodiments compares the data message's flow attributes (e.g., one or more of the data message's L2-L4 header values) and one or more of the data message's contextual attributes with match attributes of the service rules, in order to identify the highest priority service rule with match attributes that match the message's flow and contextual attributes. Examples of contextual attributes in some embodiments include source application name, application version, traffic type, resource consumption parameter, threat level, layer 7 parameters, process identifiers, user identifiers, group identifiers, process name, process hash, loaded module identifiers, etc.

Figure 8:
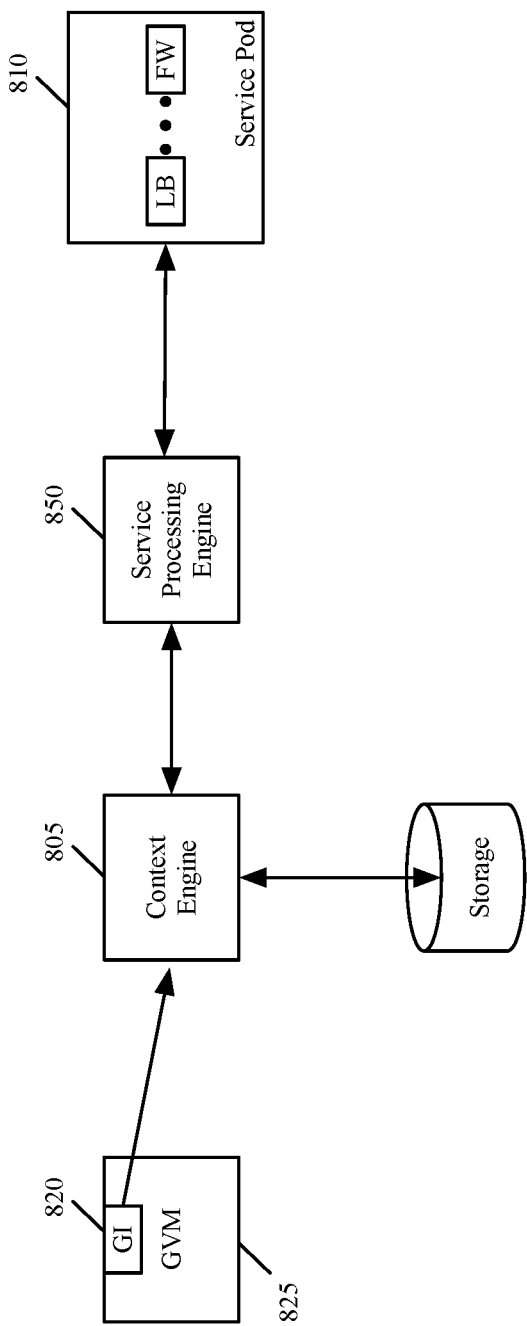
FIG. 8 illustrates a service processing engine obtaining a set of one or more contextual attributes associated with a data message from a context engine executing on the host.

FIG. 8 illustrates that in some embodiments the service processing engine 850 obtains a set of one or more contextual attributes associated with a data message from a context engine 805 executing on the host. It also shows the service processing engine passing the obtained contextual attribute set to a service Pod 810 along with the data message and a service identifier specifying the service operations to perform on the data message. As shown in FIG. 8, the context engine 805 in some embodiments obtains some or all of the contextual attributes from a guest introspection agent 820 executing on the service processing engine's GVM 825. U.S. Pat. No. 10,802,857 further describes the context engine 805 and the manner that this engine obtains contextual attributes for data message flows from GI agents that execute on the GVMs and from other service engines (such as a deep packet inspector) executing on the host computer. U.S. Pat. No. 10,802,857 is incorporated herein by reference.

Figure 9:
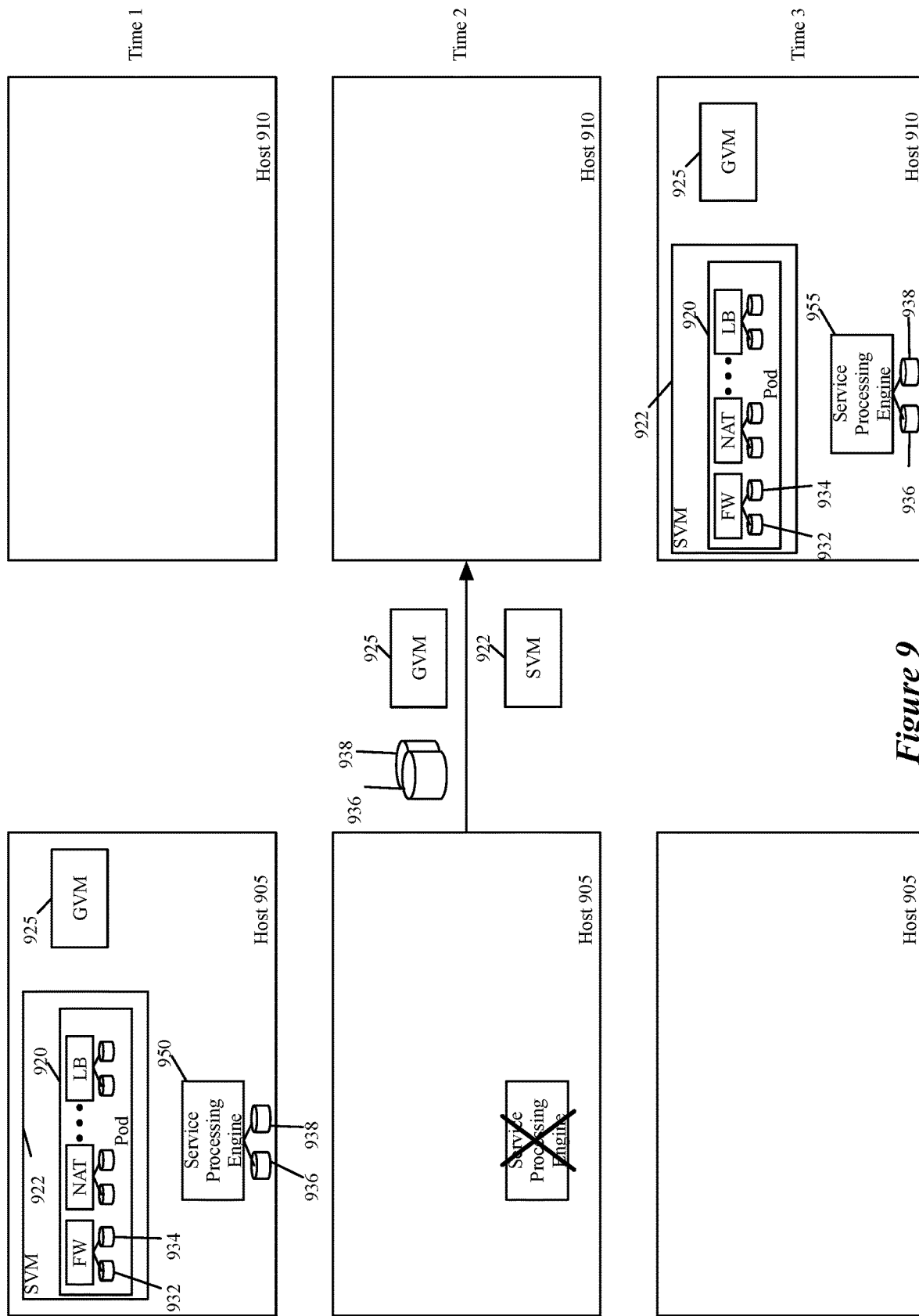
FIG. 9 illustrates in three stages (corresponding to three instances in time) the migration of a GVM from one host computer to another host computer, along with the migration of the set of service containers configured for another GVM.

FIG. 9 illustrates in three stages (corresponding to three instances in time) the migration of a GVM 925 from one host computer 905 to another host computer 910, along with the migration of the set of service containers configured for the GVM 925. In this example, the set of configured service containers all reside on one Pod 920 that executes on one SVM 922. As shown, the SVM 922 (along with its Pod and the Pod's associated service containers) migrate from host computer 905 to host computer 910 along with the GVM 925.

In some embodiments, the SVM 922 along with its Pod and the Pod's associated service containers) are defined to be part of the resource group of the GVM 925, so that VM migration tools on host computers 905 and 910 (e.g., the VM live migration of VMware vSphere) can migrate the SVM 922 to the new host computer 910 when it migrates the GVM 925 to the host computer 910. The migration tools in some embodiments migrate a VM (e.g., a GVM or SVM) to a new host computer by migrating from the old VM to the new VM (1) the configuration file that includes the definition of the VM, (2) the runtime memory (e.g., RAM data) used by the VM, (3) the device memory (e.g., storage files and data structures) used by the VM. These tools also activate (e.g., instantiate) the VM on the new host computer.

As shown in FIG. 9, each migrating service container moves to the new host computer 910 along with it service rules 932 and its connection tracking records 934. Also, the service-chain identifying rules 936 and the connection tracking records 938 of the migrating GVM's service processing engine 950 are also migrated to the new host computer 910 from the old host computer 905, so that a service processing engine 955 on the new host computer 910 can use these rules and records for data messages associated with the migrating GVM on this host computer. As shown, the service processing engine 955 is terminated once the GVM 925 migrates to host 910.

By deploying on fast, lightweight SVMs and easily migrating with their GVMs, each GVMs associated service Pod serves as an easily constructed and configured sidecar for its GVM. Deploying such a sidecar service Pod for each GVM also eliminates service bottleneck issues, which become problematic as the number of GVMs increases on host computers. This sidecar architecture is also transparent to the guest machines as it is deployed inline in their datapaths without any changes to the configuration of the guest machines. The same service Pod architecture are employed with the same benefits in the embodiments in which the guest machines are guest containers instead of guest virtual machines.

Figure 10:
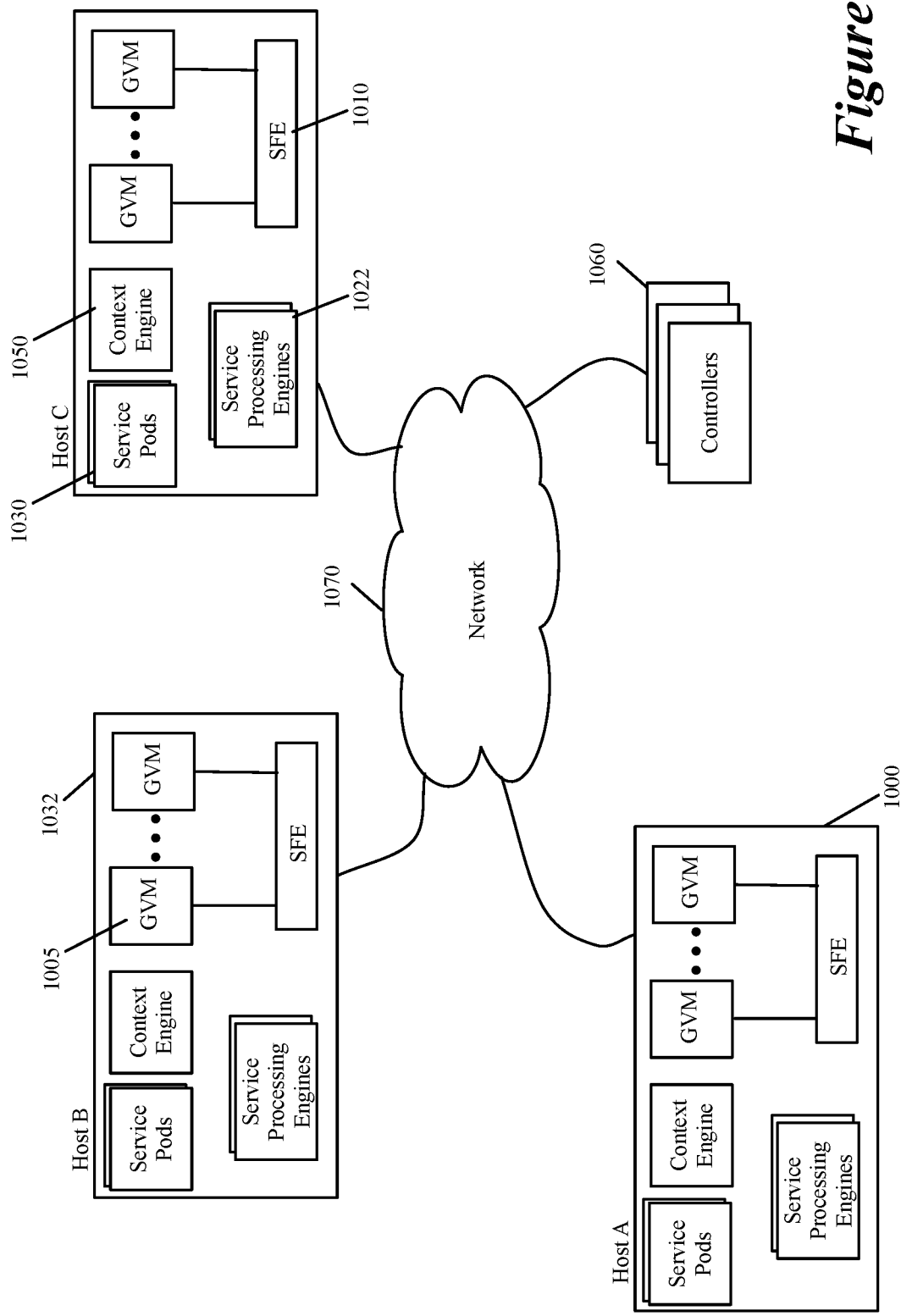
FIG. 10 illustrates an example of how the service processing engines and service Pods are managed and configured in some embodiments.

FIG. 10 illustrates an example of how the service processing engines and service Pods are managed and configured in some embodiments. This figure illustrates multiple hosts 1000 in a datacenter. As shown, each host includes several service Pods 1030, a context engine 1050, several service processing engines 1022, several GVMs 1005, and an SFE 1010.

It also illustrates a set of managers/controllers 1060 for managing the service processing engines 1022 and the service Pods 1030, GVMs 1005, and SFEs 1010. The hosts and managers/controllers communicatively connect to each other through a network 1070, which can be a local area network, a wide area network, a network of networks (such as the Internet), etc. The managers/controllers provides a user interface for the administrators to define service rules for the service processing engines 1022 and the service containers of the service Pods 1030 in terms of flow identifiers and/or contextual attributes, and communicates with the hosts through the network 1070 to provide these service rules.

In some embodiments, the context engines 1050 collect contextual attributes that are passed to the managers/controllers 1060 through a network 1070 so that these contextual attributes can be used to define service rules. The managers/controllers in some embodiments interact with the discovery engines executing on the host computers 1000 in the datacenter to obtain and refresh inventory of all processes and services that are running on the GVMs on the hosts. The management plane in some embodiments then provides a rule creation interface for allowing administrators to create service rules for the service processing engines 1022, and the service containers of the service Pods 1030. Once the service rules are defined in the management plane, the management plane supplies some or all of these rules to the hosts 1000, through a set of configuring controllers.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
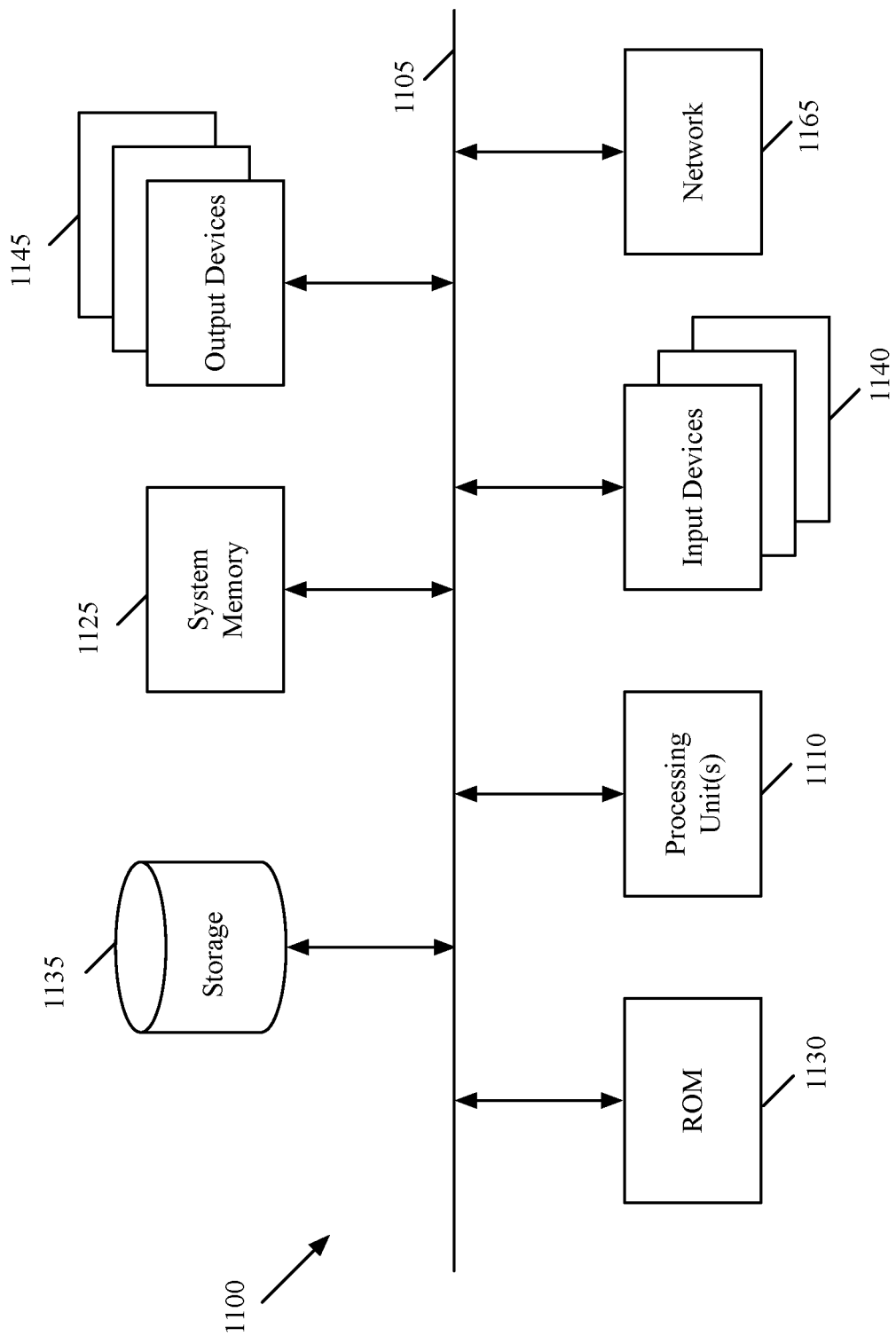
FIG. 11 conceptually illustrates a computer system with which some embodiments of the invention are implemented.

FIG. 11 conceptually illustrates a computer system 1100 with which some embodiments of the invention are implemented. The computer system 1100 can be used to implement any of the above-described hosts, controllers, and managers. As such, it can be used to execute any of the above described processes. This computer system includes various types of non-transitory machine readable media and interfaces for various other types of machine readable media. Computer system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the computer system 1100. For instance, the bus 1105 communicatively connects the processing unit(s) 1110 with the read-only memory 1130, the system memory 1125, and the permanent storage device 1135.

From these various memory units, the processing unit(s) 1110 retrieve instructions to execute and data to process in order to execute the processes of the invention. The processing unit(s) may be a single processor or a multi-core processor in different embodiments. The read-only-memory (ROM) 1130 stores static data and instructions that are needed by the processing unit(s) 1110 and other modules of the computer system. The permanent storage device 1135, on the other hand, is a read-and-write memory device. This device is a non-volatile memory unit that stores instructions and data even when the computer system 1100 is off. Some embodiments of the invention use a mass-storage device (such as a magnetic or optical disk and its corresponding disk drive) as the permanent storage device 1135.

Other embodiments use a removable storage device (such as a flash drive, etc.) as the permanent storage device. Like the permanent storage device 1135, the system memory 1125 is a read-and-write memory device. However, unlike storage device 1135, the system memory is a volatile read-and-write memory, such a random access memory. The system memory stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieve instructions to execute and data to process in order to execute the processes of some embodiments.

The bus 1105 also connects to the input and output devices 1140 and 1145. The input devices enable the user to communicate information and select commands to the computer system. The input devices 1140 include alphanumeric keyboards and pointing devices (also called "cursor control devices"). The output devices 1145 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 11, bus 1105 also couples computer system 1100 to a network 1165 through a network adapter (not shown). In this manner, the computer can be a part of a network of computers (such as a local area network ("LAN"), a wide area network ("WAN"), or an Intranet, or a network of networks, such as the Internet. Any or all components of computer system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for providing services on a host computer that executes a plurality of machines, the method comprising:

configuring, for a first machine executing on the host computer, a first plurality of service containers to perform a first plurality of service operations for the first machine;

configuring, for a second machine executing on the host computer, a second plurality of service containers to perform a second plurality of service operations for the second machine, said first and second pluralities of service containers executing on the host computer;

configuring, for each particular machine of the first and second machines, a module along the particular machine's data path to identify a set of service operations to perform on a set of data messages associated with the particular machine, and to direct the set of data messages to a set of service containers configured for the particular machine to perform the identified set of service operations on the set of data messages.

2. The method of claim 1, wherein the first and second pluralities of service containers are respectively configured when the first and second machines are configured on the host computers.

3. The method of claim 1, wherein at least two service containers in the first plurality of service containers are configured on two separate Pods.

4. The method of claim 1, wherein the first and second machines belong to one logical network implemented over a physical network on which a plurality of logical networks are defined.

5. The method of claim 1, wherein each particular machine's configured module is a classifier that for a data message that it processes, identifies a set of service operations that have to be performed on the data message, and passes the data message to a set of service containers to perform the identified set of service operations on the data message.

6. The method of claim 5, wherein the module successively passes the data message to successive service containers in the identified set of service containers after receiving the data message from each service container in the identified set of service containers.

7. The method of claim 5, wherein the module passes the data message by generating a service identifier that specifies the identified set of service operations that have to be performed on the data message by a set of service containers, and providing the service identifier along with the data message so that the data message can be forwarded to successive service containers in the identified set of service containers.

8. The method of claim 7, wherein service operations in the set of service operations identified by the classifier have a particular order, and the service identifier specifies the particular order.

9. The method of claim 7, wherein a forwarding element executing on the host computer processes each generated service identifier in order to identify the set of services that has to be performed on the data message for which the service identifier is generated, and to successively provide the data message to service containers in the set of service containers to perform the identified set of service operations.

10. The method of claim 1, wherein at least one service container in the first plurality of service containers performs a same middlebox service operation as one service container in the second plurality of service containers, and at least another service container in the first plurality of service containers performs another middlebox service operation that is not performed by any other service container in the second plurality of service containers.

11. A method for providing services on a host computer that executes a plurality of machines, the method comprising:
configuring, for a first machine executing on the host computer, a first plurality of service containers to perform a first plurality of service operations for the first machine, said configuring the first plurality of service containers comprising configuring on the host computer a first Pod on which the first plurality of service containers for the first machine operate;
configuring, for a second machine executing on the host computer, a second plurality of service containers to perform a second plurality of service operations for the second machine, said first and second pluralities of service containers executing on the host computer, said configuring the second plurality of service containers comprising configuring on the host computer a second Pod on which the second plurality of service containers for the second machine operate;
configuring, for each particular machine of the first and second machines, a module along the particular machine's data path to identify a set of service operations to perform on a set of data messages associated with the particular machine, and to direct the set of data messages to a set of service containers configured for the particular machine to perform the identified set of service operations on the set of data messages.

12. A non-transitory machine readable medium storing a program for execution by at least one processing unit of the host computer, the program providing services on the host computer that executes a plurality of machines, the program comprising sets of instructions for:
configuring, for a first machine executing on the host computer, a first plurality of service containers to perform a first plurality of service operations for the first machine;
configuring, for a second machine executing on the host computer, a second plurality of service containers to perform a second plurality of service operations for the second machine, said first and second pluralities of service containers executing on the host computer;
configuring, for each particular machine of the first and second machines, a module along the particular machine's data path to identify a set of service operations to perform on a set of data messages associated with the particular machine, and to direct the set of data messages to a set of service containers configured for the particular machine to perform the identified set of service operations on the set of data messages.

13. The non-transitory machine readable medium of claim 12, wherein the first and second pluralities of service containers are respectively configured when the first and second machines are configured on the host computers.

14. The non-transitory machine readable medium of claim 12, wherein the program further comprises sets of instructions for:
configuring a first Pod on which the first plurality of service containers for the first machine are configured;
configuring a second Pod on which the second plurality of service containers for the second machine are configured.

15. The non-transitory machine readable medium of claim 12, wherein at least two service containers in the first plurality of service containers are configured on two separate Pods.

16. The non-transitory machine readable medium of claim 12, wherein the first and second machines belong to one logical network implemented over a physical network on which a plurality of logical networks are defined.

17. The non-transitory machine readable medium of claim 12, wherein each particular machine's configured module is a classifier that for a data message that it processes, identifies a set of service operations that have to be performed on the data message, and passes the data message to a set of service containers to perform the identified set of service operations on the data message.

18. The non-transitory machine readable medium of claim 17, wherein the module successively passes the data message to successive service containers in the identified set of service containers after receiving the data message from each service container in the identified set of service containers.

19. The non-transitory machine readable medium of claim 17, wherein the module passes the data message by generating a service identifier that specifies the identified set of service operations that have to be performed on the data message by a set of service containers, and providing the service identifier along with the data message so that the data message can be forwarded to successive service containers in the identified set of service containers.

20. The non-transitory machine readable medium of claim 19, wherein service operations in the set of service operations identified by the classifier have a particular order, and the service identifier specifies the particular order.

21. The non-transitory machine readable medium of claim 19, wherein a forwarding element executing on the host computer processes each generated service identifier in order to identify the set of services that has to be performed on the data message for which the service identifier is generated, and to successively provide the data message to service containers in the set of service containers to perform the identified set of service operations.

* * * * *